US008566473B2

(12) United States Patent
Ajanovic et al.

(10) Patent No.: US 8,566,473 B2
(45) Date of Patent: *Oct. 22, 2013

(54) GENERAL INPUT/OUTPUT ARCHITECTURE, PROTOCOL AND RELATED METHODS TO IMPLEMENT FLOW CONTROL

(75) Inventors: Jasmin Ajanovic, Portland, OR (US); David Harriman, Portland, OR (US); Blaise Fanning, El Dorado Hills, CA (US); David M. Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 12/395,497

(22) Filed: Feb. 27, 2009

(65) Prior Publication Data

US 2009/0193164 A1 Jul. 30, 2009

Related U.S. Application Data

(63) Continuation of application No. 10/227,601, filed on Aug. 23, 2002, now Pat. No. 7,536,473.

(60) Provisional application No. 60/314,708, filed on Aug. 24, 2001.

(51) Int. Cl.
*G06F 15/16* (2006.01)

(52) U.S. Cl.
USPC ........... 709/234; 370/229; 370/231; 370/232; 370/233; 370/235

(58) Field of Classification Search
USPC ............... 709/234; 370/229, 231–233, 235
See application file for complete search history.

(56) References Cited

U.S. PATENT DOCUMENTS

| 4,430,700 A | 2/1984 | Chadima, Jr. et al. |
| 4,475,192 A | 10/1984 | Fernow et al. |
| 4,791,639 A | 12/1988 | Afheldt et al. |
| 5,001,707 A | 3/1991 | Kositpaiboon et al. |

(Continued)

FOREIGN PATENT DOCUMENTS

| EA | 1001574 A1 | 5/2000 |
| EP | 0696154 A2 | 2/1996 |

(Continued)

OTHER PUBLICATIONS

"Infiniband Architecture Release 1.0, vol. 1, General Specifications", InfiniBandTM Architecture Specification, XP-002214159, InfiniBand SM Trade Association, (Oct. 24, 2000), pp. 1-880.

(Continued)

*Primary Examiner* — Alicia Baturay
(74) *Attorney, Agent, or Firm* — Blakely, Sokoloff, Taylor & Zafman LLP

(57) ABSTRACT

An enhanced general input/output communication architecture, protocol and related methods are presented. In one embodiment, a method for an enhanced general input/output communication architecture includes initializing a flow control mechanism within an general input/output (GIO) interface associated with a virtual channel upon initialization of the virtual channel, and tracking receive buffer availability in a remote GIO interface coupled with the GIO interface by the virtual channel by monitoring an indication associated with an amount of content transmitted from the GIO interface to the remote GIO interface.

23 Claims, 6 Drawing Sheets

(56) References Cited

U.S. PATENT DOCUMENTS

| | | | |
|---|---|---|---|
| 5,007,051 A | 4/1991 | Dolkas et al. | |
| 5,140,587 A | 8/1992 | Mueller et al. | |
| 5,164,938 A | 11/1992 | Jurkevich et al. | |
| 5,289,461 A | 2/1994 | de Nijs | |
| 5,315,586 A | 5/1994 | Charvillat | |
| 5,353,282 A | 10/1994 | Dormer | |
| 5,353,382 A | 10/1994 | Yariv et al. | |
| 5,450,411 A | 9/1995 | Heil | |
| 5,457,701 A | 10/1995 | Wasilewski et al. | |
| 5,463,620 A | 10/1995 | Sriram | |
| 5,463,629 A | 10/1995 | Ko | |
| 5,463,762 A | 10/1995 | Morrissey et al. | |
| 5,491,694 A | 2/1996 | Oliver et al. | |
| 5,513,314 A | 4/1996 | Kandasamy et al. | |
| 5,561,669 A | 10/1996 | Lenney et al. | |
| 5,583,995 A | 12/1996 | Gardner et al. | |
| 5,600,644 A | 2/1997 | Chang et al. | |
| 5,633,867 A | 5/1997 | Ben-Nun et al. | |
| 5,688,810 A | 11/1997 | Jones et al. | |
| 5,689,550 A | 11/1997 | Garson et al. | |
| 5,719,853 A * | 2/1998 | Ikeda | 370/229 |
| 5,745,837 A | 4/1998 | Fuhrmann | |
| 5,748,613 A | 5/1998 | Kilk et al. | |
| 5,748,629 A | 5/1998 | Caldara et al. | |
| 5,771,387 A * | 6/1998 | Young et al. | 710/260 |
| 5,852,602 A | 12/1998 | Sugawara et al. | |
| 5,867,480 A | 2/1999 | Thomas et al. | |
| 5,875,308 A | 2/1999 | Egan et al. | |
| 5,923,655 A | 7/1999 | Veschi et al. | |
| 5,935,224 A | 8/1999 | Svancarek et al. | |
| 5,948,136 A | 9/1999 | Smyers | |
| 5,953,338 A | 9/1999 | Ma et al. | |
| 5,958,064 A | 9/1999 | Judd et al. | |
| 6,003,062 A | 12/1999 | Greenberg et al. | |
| 6,009,488 A | 12/1999 | Kavipurapu | |
| 6,026,460 A * | 2/2000 | David et al. | 710/309 |
| 6,044,081 A | 3/2000 | Bell et al. | |
| 6,044,406 A | 3/2000 | Barkey et al. | |
| 6,046,979 A * | 4/2000 | Bauman | 370/229 |
| 6,118,761 A * | 9/2000 | Kalkunte et al. | 370/229 |
| 6,137,793 A | 10/2000 | Gorman et al. | |
| 6,157,972 A | 12/2000 | Newman et al. | |
| 6,198,722 B1 * | 3/2001 | Bunch | 370/229 |
| 6,208,645 B1 | 3/2001 | James et al. | |
| 6,212,582 B1 * | 4/2001 | Chong et al. | 710/57 |
| 6,215,789 B1 | 4/2001 | Keenan et al. | |
| 6,243,358 B1 * | 6/2001 | Monin | 370/229 |
| 6,249,819 B1 | 6/2001 | Hunt et al. | |
| 6,253,334 B1 | 6/2001 | Amdahl et al. | |
| 6,266,345 B1 | 7/2001 | Huang | |
| 6,269,464 B1 | 7/2001 | Boussina et al. | |
| 6,279,035 B1 * | 8/2001 | Brown et al. | 709/224 |
| 6,292,865 B1 * | 9/2001 | McTague et al. | 710/262 |
| 6,330,225 B1 | 12/2001 | Weber et al. | |
| 6,343,260 B1 | 1/2002 | Chew | |
| 6,347,097 B1 | 2/2002 | Deng | |
| 6,366,968 B1 * | 4/2002 | Hunsaker | 710/52 |
| 6,381,672 B1 | 4/2002 | Strongin et al. | |
| 6,393,506 B1 | 5/2002 | Kenny | |
| 6,400,681 B1 | 6/2002 | Bertin et al. | |
| 6,512,767 B1 | 1/2003 | Takeda et al. | |
| 6,542,467 B2 | 4/2003 | Umayabashi | |
| 6,601,056 B1 | 7/2003 | Kagle et al. | |
| 6,625,146 B1 | 9/2003 | Merchant et al. | |
| 6,639,919 B2 | 10/2003 | Kroninger et al. | |
| 6,658,519 B1 * | 12/2003 | Broberg et al. | 710/311 |
| 6,683,850 B1 * | 1/2004 | Dunning et al. | 370/231 |
| 6,691,192 B2 * | 2/2004 | Ajanovic et al. | 710/107 |
| 6,721,813 B2 * | 4/2004 | Owen et al. | 710/6 |
| 6,728,211 B1 * | 4/2004 | Peris et al. | 370/235 |
| 6,735,173 B1 * | 5/2004 | Lenoski et al. | 370/235 |
| 6,745,272 B2 * | 6/2004 | Owen et al. | 710/107 |
| 6,751,214 B1 | 6/2004 | Parruck et al. | |
| 6,757,768 B1 * | 6/2004 | Potter et al. | 710/112 |
| 6,760,793 B2 * | 7/2004 | Kelley et al. | 710/52 |
| 6,763,025 B2 | 7/2004 | Leatherbury et al. | |
| 6,765,885 B2 | 7/2004 | Jiang et al. | |
| 6,810,396 B1 | 10/2004 | Blumenau et al. | |
| 6,832,279 B1 * | 12/2004 | Potter et al. | 710/112 |
| 6,891,881 B2 | 5/2005 | Trachewsky et al. | |
| 6,922,408 B2 * | 7/2005 | Bloch et al. | 370/389 |
| 6,944,719 B2 * | 9/2005 | Rowlands et al. | 711/141 |
| 6,950,394 B1 * | 9/2005 | Chou et al. | 370/229 |
| 6,950,438 B1 * | 9/2005 | Owen et al. | 370/409 |
| 6,965,566 B2 * | 11/2005 | Kawasaki et al. | 370/235 |
| 6,976,201 B2 | 12/2005 | Shin et al. | |
| 6,993,611 B2 * | 1/2006 | Ajanovic et al. | 710/107 |
| 7,010,607 B1 * | 3/2006 | Bunton | 709/228 |
| 7,012,893 B2 * | 3/2006 | Bahadiroglu | 370/231 |
| 7,069,361 B2 * | 6/2006 | Owen et al. | 710/107 |
| 7,152,128 B2 * | 12/2006 | Wehage et al. | 710/305 |
| 7,177,971 B2 | 2/2007 | Ajanovic | |
| 7,231,486 B2 * | 6/2007 | Ajanovic et al. | 710/315 |
| 7,296,101 B2 * | 11/2007 | Lee et al. | 710/55 |
| 7,301,898 B1 * | 11/2007 | Martin et al. | 370/229 |
| 7,315,911 B2 * | 1/2008 | Davies et al. | 710/260 |
| 7,536,473 B2 * | 5/2009 | Ajanovic et al. | 709/234 |
| 2001/0005897 A1 | 6/2001 | Kawagishi et al. | |
| 2001/0047383 A1 | 11/2001 | Dutta | |
| 2002/0112084 A1 | 8/2002 | Deen et al. | |
| 2002/0152346 A1 | 10/2002 | Stone et al. | |
| 2002/0178243 A1 | 11/2002 | Collins | |
| 2003/0005039 A1 * | 1/2003 | Craddock et al. | 709/203 |
| 2003/0115380 A1 * | 6/2003 | Ajanovic et al. | 710/1 |
| 2003/0115391 A1 * | 6/2003 | Ajanovic et al. | 710/107 |
| 2003/0115513 A1 * | 6/2003 | Harriman et al. | 714/49 |
| 2003/0131179 A1 * | 7/2003 | Ajanovic et al. | 710/316 |
| 2003/0145134 A1 * | 7/2003 | Wehage et al. | 710/1 |
| 2003/0158992 A1 * | 8/2003 | Ajanovic et al. | 710/305 |
| 2005/0018609 A1 * | 1/2005 | Dally et al. | 370/235 |
| 2005/0137966 A1 * | 6/2005 | Munguia et al. | 705/38 |
| 2005/0182869 A1 * | 8/2005 | Lee et al. | 710/55 |
| 2007/0130397 A1 * | 6/2007 | Tsu | 710/62 |
| 2007/0174344 A1 * | 7/2007 | Goh et al. | 707/200 |

FOREIGN PATENT DOCUMENTS

| | | |
|---|---|---|
| EP | 0713347 A2 | 5/1996 |
| EP | 1049019 A1 | 11/2000 |
| WO | WO-99/00737 | 1/1999 |
| WO | WO-01/13564 | 2/2001 |

OTHER PUBLICATIONS

"Intel 82806AA Hub (P64H)", Intel Corporation, XP002224838, Retrieved from the Internet on Dec. 12, 2002: <URL:http://www.intel.com/design/chipsets/datashts/29720520/pdf., (Mar. 2001), pp. 1-95.

"PCI Express Base Specification Revision 1.0", PCI-SIG, (Apr. 29, 2002), pp. 1-416.

"PCI Family History", PCI-SIG Developers Conference, (2006), p. 1.

"Will IEEE 1394 Ultimately Replace USB?", American Megatrends, Inc., (Mar. 11, 1998).

Budruk, R. , et al., "PCI Express System Architecture", Addison Wesley Professional, (Sep. 4, 2003), pp. 55-96, 106-249 and 286-312.

Kamolphiwong, S. , et al., "Flow Control in ATM Networks: A Survey", *Computer Communications*, vol. 21, No. 11, XP-004138768, Elsevier Science Publishers BV, Amsterdam, NL, (Aug. 10, 1998), pp. 951-968.

Kung, H. T., et al., "Credit-Based Flow Control for ATM Networks", *IEEE Network Magazine*, vol. 9, Issue 2, (Mar.-Apr. 1995), pp. 40-48.

Kung, H. T., et al., "Receiver-Oriented Adaptive Buffer Allocation in Credit-Based Flow Control for ATM Networks", INFOCOM 1995, Fourteenth Annual Joint Conference of IEEE Computer and Communications Societies, vol. 1, (Apr. 1995), pp. 239-252.

Medard, M. , et al., "A Network Management Architecture for Robust Packet Routing in Mesh Optical Access Networks", (May 2000).

Tsai, Z. , et al., "A Dynamic Bandwidth Allocation Scheme for ATM Networks", (abstract only), (Mar. 23-26, 1993).

Wong, E.W.M. , et al., "Bandwidth Allocation and Routing in Virtual Path Based ATM Networks", (abstract only), (Jun. 23-27, 1996).

(56) References Cited

OTHER PUBLICATIONS

Office Action from foreign counterpart China Patent Application No. 02816581.0, mailed Jul. 14, 2006, 9 pgs.
Notice of Grant of a Patent Right for an Invention from foreign counterpart China Patent Application No. 02816581.0, mailed Sep. 11, 2007, 3 pgs.
Notice of Grant of a Patent Right for an Invention from foreign counterpart China Patent Application No. 02816581.0, mailed Jul. 6, 2006, 1 pg.
Notice of Invention of Patent Certificate from foreign counterpart China Patent Application No. 02816581.0 now Patent No. ZL 02 8 16581.0, mailed Dec. 26, 2006, 3 pgs.
Office Action from foreign counterpart European Patent Application No. 02761480.9, mailed Aug. 3, 2004, 4 pgs.
Office Action from foreign counterpart European Patent Application No. 02761480.9, mailed Sep. 26, 2005, 4 pgs.
Patent Grant from foreign counterpart European Patent Application No. 02761480.9, mailed Mar. 3, 2006, 7 pgs.
Final Rejection Office Action from foreign counterpart Korean Patent Application No. 10-2004-7002661, mailed Jun. 16, 2006, 4 pgs.
Letters Patent from foreign counterpart Korean Patent Application No. 10-2004-7002661, mailed Jan. 14, 2008, 3 pgs.
Notification of Amendment Dismissal together with Notice of Reconsideration Result from foreign counterpart Korean Patent Application No. 10-2004-7002661, mailed Jan. 14, 2008, 3 pgs.

\* cited by examiner

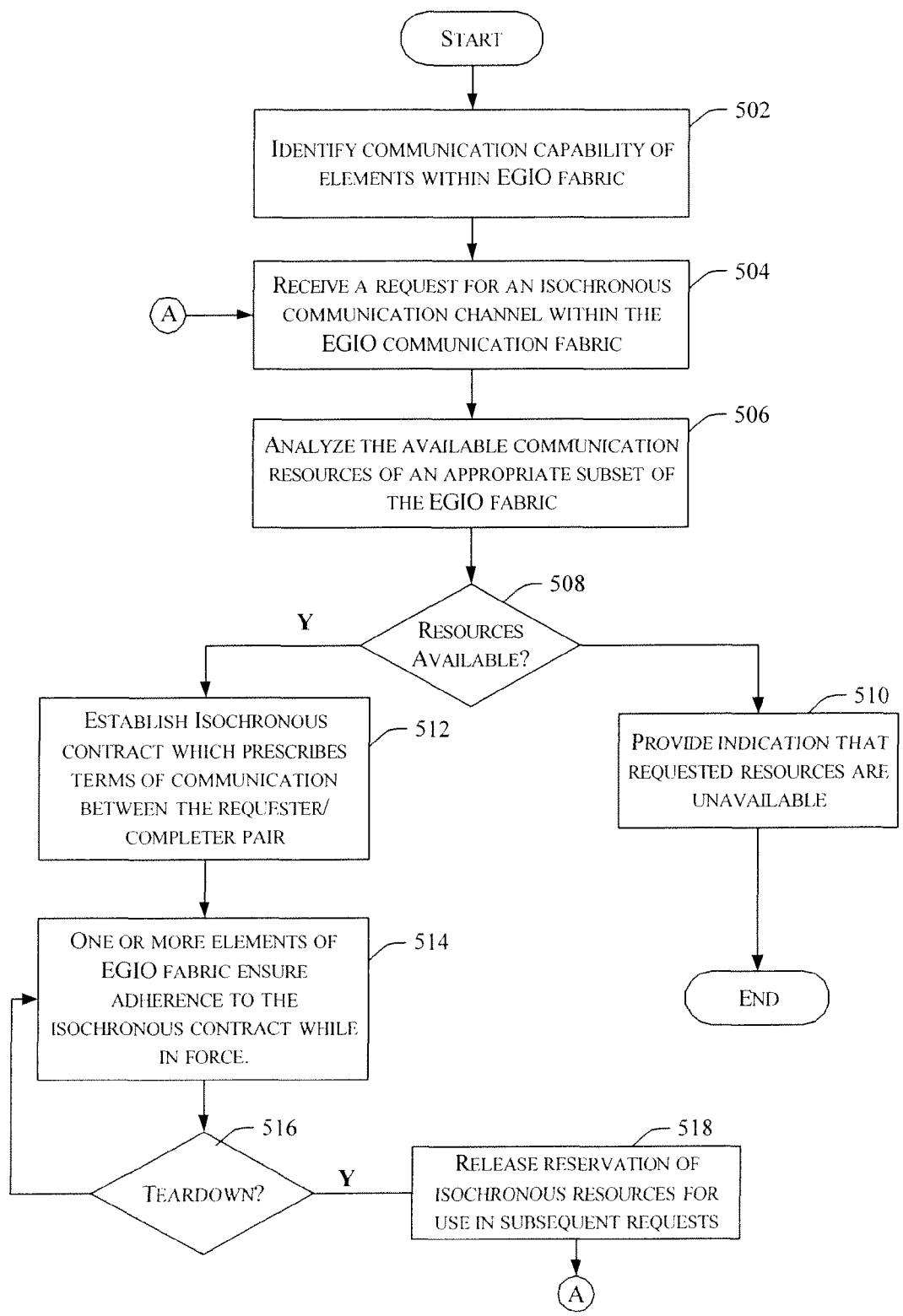

GENERAL INPUT/OUTPUT ARCHITECTURE, PROTOCOL AND RELATED METHODS TO IMPLEMENT FLOW CONTROL

PRIORITY

This application is a continuation of U.S. Non-Provisional application Ser. No. 10/227,601 entitled General Input/Output Architecture, Protocol and Related Methods to Implement Flow Control filed on Aug. 23, 2002 by Ajanovic et al., now U.S. Pat. No. 7,536,473 issued May 19, 2009, which claims priority to U.S. Provisional Application No. 60/314,708 entitled A High-speed, Point-to-Point Interconnection and Communication Architecture, Protocol and Related Methods filed on Aug. 24, 2001 by Ajanovic et al, and commonly assigned to the Assignee of this application.

TECHNICAL FIELD

Embodiments of the invention generally relate to the field of general input/output (GIO) bus architectures and, more particularly, to an architecture, protocol and related methods to implement flow control between elements within a GIO bus architecture.

BACKGROUND

Computing appliances, e.g., computer systems, servers, networking switches and routers, wireless communication devices, and other electronic devices are typically comprised of a number of electronic components, or elements. Such elements often include a processor, microcontroller or other control logic, a memory system, input and output interface(s), peripheral elements and the like. To facilitate communication between such elements, computing appliances have long relied on a general purpose input/output (GIO) bus architecture to enable these disparate elements of the computing appliance to communicate with one another in support of the myriad of applications offered by such appliances.

Perhaps one of the most pervasive of such conventional GIO bus architectures is the peripheral component interconnect bus, or PCI, bus architecture. The PCI bus standard (Peripheral Component Interconnect (PCI) Local Bus Specification, Rev. 2.2, released Dec. 18, 1998) defines a multi-drop, parallel bus architecture for interconnecting chips, expansion boards, and processor/memory subsystems in an arbitrated fashion within a computing appliance. The content of the PCI local bus standard is expressly incorporated herein by reference, for all purposes.

While conventional PCI bus implementations have a 133 MBps throughput (i.e., 32 bytes at 33 MHz), the PCI 2.2 standard allows for 64 bytes per pin of the parallel connection clocked at up to 133 MHz resulting in a theoretical throughput of just over 1 GBps. In this regard, the throughput provided by such conventional multi-drop PCI bus architectures has, until recently, provided adequate bandwidth to accommodate the internal communication needs of even the most advanced of computing appliances (e.g., multiprocessor server applications, network appliances, etc.). However, with recent advances in processing power taking processing speeds above the 1 Ghz threshold, coupled with the widespread deployment of broadband Internet access, conventional GIO architectures such as the PCI bus architecture have become a bottleneck within such computing appliances.

Another limitation commonly associated with conventional GIO architectures is that they are typically not well-suited to handle/process isochronous (or, time dependent) data streams. An example of just such an isochronous data stream is multimedia data streams, which require an isochronous transport mechanism to ensure that the data is consumed as fast as it is received, and that the audio portion is synchronized with the video portion.

Conventional GIO architectures process data asynchronously, or in random intervals as bandwidth permits. Such asynchronous processing of isochronous data can result in misaligned audio and video and, as a result, certain providers of isochronous multimedia content have rules that prioritize certain data over other data, e.g., prioritizing audio data over video data so that at least the end-user receives a relatively steady stream of audio (i.e., not broken-up) so that they may enjoy the song, understand the story, etc. that is being streamed.

BRIEF DESCRIPTION OF THE DRAWINGS

The present invention is illustrated by way of example, and not by way of limitation, in the figures of the accompanying drawings in which like reference numerals refer to similar elements and in which:

FIG. 5 is a flow chart of an example method to provide isochronous communication resources within the EGIO architecture, according to one embodiment of the invention;

DETAILED DESCRIPTION

Figure 1:
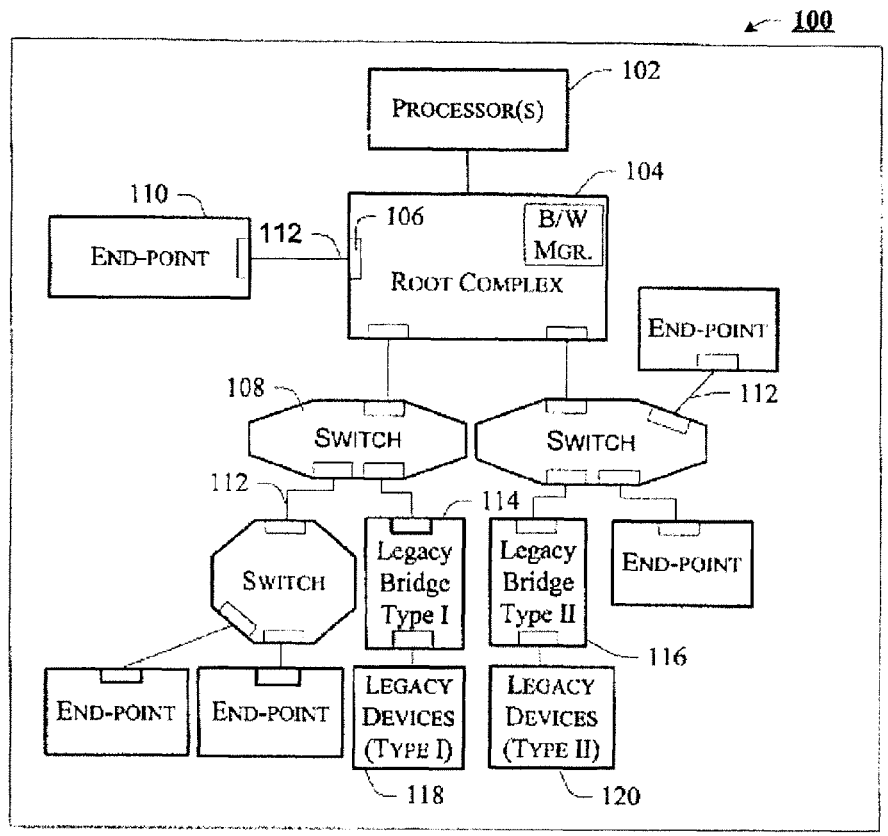
FIG. 1 is a block diagram of an electronic appliance incorporating one or more aspects of an embodiment of the invention to facilitate communication between one or more constituent elements of the appliance.

Embodiments of the invention are generally directed to a general purpose input/output (GIO) architecture, protocol and related methods to implement flow control therein. In this regard, an innovative enhanced general input/output (EGIO) interconnection architecture, associated communication protocol and related methods are introduced. According to one example embodiment, the elements of an EGIO architecture include one or more of a root complex (e.g., implemented within a bridge), a switch, and end-points, each incorporating at least a subset of EGIO features to support EGIO communication between such elements.

Communication between the EGIO facilities of such elements is performed using serial communication channel(s) using an EGIO communication protocol which, as will be developed more fully below, supports one or more innovative features including, but not limited to, virtual communication channels, tailer-based error forwarding, support for legacy PCI-based devices and their interrupts, multiple request response type(s), flow control and/or data integrity management facilities. According to one aspect of the invention, the communication protocol is supported within each of the elements of the computing appliance with introduction of an EGIO communication protocol stack, the stack comprising a physical layer, a data link layer and a transaction layer.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In light of the foregoing, and the description to follow, those skilled in the art will appreciate that one or more elements of the present invention may well be embodied in hardware, software, a propagated signal, or a combination thereof.

Terminology

Before delving into the particulars of the innovative EGIO interconnection architecture, communication protocol and related methods, it may be useful to introduce the elements of the vocabulary that will be used throughout this detailed description:

Advertise: Used in the context of EGIO flow control to refer to the act of a receiver sending information regarding its flow control credit availability by using a flow control update message of the EGIO protocol;

Completer: A logical device addressed by a request;

Completer ID: A combination of one or more of a completer's bus identifier (e.g., number), device identifier, and a function identifier which uniquely identifies the completer of the request;

Completion: A packet used to terminate, or to partially terminate a sequence is referred to as a completion. According to one example implementation, a completion corresponds to a preceding request, and in some cases includes data;

Configuration space: One of the four address spaces within the EGIO architecture. Packets with a configuration space address are used to configure a device;

Component: A physical device (i.e., within a single package);

Data Link Layer: The intermediate layer of the EGIO architecture that lies between the transaction layer (above) and the physical layer (below);

DLLP: Data link layer packet is a packet generated and consumed at the data link layer to support link management functions performed at the Data Link Layer;

Downstream: refers to either the relative position of an element, or the flow of information away from the host bridge;

End-point: an EGIO device with a type 00h configuration space header;

Flow Control: A method for communicating receive buffer information from a receiver to a transmitter to prevent receive buffer overflow and to allow transmitter compliance with ordering rules;

Flow Control Packet (FCP): A transaction layer packet (TLP) used to send flow control information from the transaction layer in one component to a transaction layer in another component;

Function: One independent section of a multi-function device identified in configuration space by a unique function identifier (e.g., a function number);

Hierarchy: Defines the I/O interconnect topology implemented in the EGIO architecture. A hierarchy is characterized by a Root Complex corresponding to the link closest to the enumerating device (e.g., the host CPU);

Hierarchy domain: An EGIO hierarchy is segmented into multiple fragments by a root complex that source more than one EGIO interface, wherein such fragments are referred to as a hierarchy domain;

Host Bridge: Connects a host CPU complex to a Root Complex; Host bridge may provide Root Complex;

IO Space: One of the four address spaces of the EGIO architecture;

Lane: A set of differential signal pairs of the physical link, one pair for transmission and one pair for reception. A by-N link is comprised of N lanes;

Link: A dual-simplex communication path between two components; the collection of two ports (one transmit and one receive) and their interconnecting lane(s);

Logical Bus: The logical connection among a collection of devices that have the same bus number in configuration space;

Logical Device: An element of an EGIO architecture that responds to a unique device identifier in configuration space;

Memory Space: One of the four address spaces of the EGIO architecture;

Message: A packet with a message space type;

Message Space: One of the four address spaces of the EGIO architecture. Special cycles as defined in PCI are included as a subset of Message Space and, accordingly, provides an interface with legacy device(s);

Legacy Software Model(s): The software model(s) necessary to initialize, discover, configure and use a legacy device (e.g., inclusion of the PCI software model in, for example, an EGIO-to-Legacy Bridge facilitates interaction with legacy devices);

Physical Layer: The layer of the EGIO architecture that directly interfaces with the communication medium between the two components;

Port: An interface associated with a component, between that component and a EGIO link;

Receiver: The component receiving packet information across a link is the receiver (sometimes referred to as a target);

Request: A packet used to initiate a sequence is referred to as a request. A request includes some operation code and, in some cases, includes address and length, data or other information;

Requester: A logical device that first introduces a sequence into the EGIO domain;

Requester ID: A combination of one or more of a requester's bus identifier (e.g., bus number), device identifier and a function identifier that uniquely identifies the requester. In most cases, an EGIO bridge or switch forwards requests from one interface to another without modifying the requester ID. A bridge from a bus other than an EGIO bus should typically store the requester ID for use when creating a completion for that request;

Root Complex: An entity that includes a Host Bridge and one or more Root Ports;

Root Port: An EGIO Port on a root complex that maps a portion of the EGIO interconnect hierarchy through an associated virtual PCI-PCI bridge;

Sequence: A single request and zero or more completions associated with carrying out a single logical transfer by a requester;

Sequence ID: A combination of one or more of a requester ID and a Tag, wherein the combination uniquely identifies requests and completions that are part of a common sequence;

Split transaction: A single logical transfer containing an initial transaction (the split request) that the target (the completer, or bridge) terminates with a split response, followed by one or more transactions (the split completions) initiated by the completer (or bridge) to send the read data (if a read) or a completion message back to the requester;

Symbol: A 10 bit quantity produced as the result of 8 b/10 b encoding;

Symbol Time: The period of time required to place a symbol on a lane;

Tag: A number assigned to a given sequence by the requester to distinguish it from other sequences—part of the sequence ID;

Transaction Layer Packet: TLP is a packet generated within the transaction layer to convey a request or completion;

Transaction Layer: The outermost (uppermost) layer of the EGIO architecture that operates at the level of transactions (e.g., read, write, etc.).

Transaction Descriptor: An element of a packet header that, in addition to address, length and type describes the properties of a transaction.

Example Electronic Appliance and the EGIO Architecture

FIG. 1 provides a block diagram of electronic appliance 100 incorporating an enhanced general input/output (EGIO) interconnect architecture, protocol and related methods, in accordance with an example embodiment of the invention. As shown, electronic appliance 100 is depicted comprising a number of electronic elements including one or more of processor(s) 102, a root complex (e.g., including a host bridge) 104, switches 108 and end-points 110, each coupled as shown. In accordance with the teachings of the present invention, at least root complex 104, switch(es) 108, and end-points 110 are endowed with one or more instances of an EGIO communication interface 106 to facilitate one or more aspects of embodiments of the present invention.

As shown, each of the elements 102, 104, 108 and 110 are communicatively coupled to at least one other element through a communication link 112 supporting one or more EGIO communication channel(s) via the EGIO interface 106. According to one example implementation, the operating parameters of the EGIO interconnection architecture is established during an initialization event of the host electronic appliance, or upon the dynamic connection of a peripheral to the electronic appliance (e.g., hot-plug device). As introduced above, electronic appliance 100 is intended to represent one or more of any of a wide variety of traditional and non-traditional computing systems, servers, network switches, network routers, wireless communication subscriber units, wireless communication telephony infrastructure elements, personal digital assistants, set-top boxes, or any electric appliance that would benefit from the communication resources introduced through integration of at least a subset of the EGIO interconnection architecture, communications protocol or related methods described herein.

In accordance with the illustrated example implementation of FIG. 1, electronic appliance 100 is endowed with one or more processor(s) 102. As used herein, processor(s) 102 control one or more aspects of the functional capability of the electronic appliance 100. In this regard, processor(s) 102 are representative of any of a wide variety of control logic including, but not limited to one or more of a microprocessor, a programmable logic device (PLD), programmable logic array (PLA), application specific integrated circuit (ASIC), a microcontroller, and the like.

As introduced above, the root complex 104 provides an EGIO communications interface between processor 102 and/or a processor/memory complex and one or more other elements 108, 110 of the electronic appliance EGIO architecture. As used herein, the root complex 104 refers to a logical entity of an EGIO hierarchy that is closest to a host controller, a memory controller hub, an IO controller hub, any combination of the above, or some combination of chipset/CPU elements (i.e., in a computing system environment). In this regard, although depicted in FIG. 1 as a single unit, root complex 104 may well be thought of as a single logical entity that may well have multiple physical components.

According to the illustrated example implementation of FIG. 1, root complex 104 is populated with one or more EGIO interface(s) 106 to facilitate communication with other peripheral devices, e.g., switch(es) 108, end-point(s) 110 and, although not particularly depicted, legacy bridge(s) 114, or 116. According to one example implementation, each EGIO interface 106 represents a different EGIO hierarchy domain. In this regard, the illustrated implementation of FIG. 1 denotes a root complex 104 with three (3) hierarchy domains. It should be noted that although depicted as comprising multiple separate EGIO interfaces 106, alternate implementations are anticipated wherein a single interface 106 is endowed with multiple ports to accommodate communication with multiple devices.

According to one example implementation, root complex 104 is responsible for identifying the communication requirements (e.g., virtual channel requirements, isochronous channel requirements, etc.) of each of the elements of the EGIO architecture. According to one example implementation, such communication requirements are passed to the root complex 104 during an initialization event of the host appliance 100, or any element thereof (e.g., in a hot-plug event). In an alternate embodiment, root complex 104 interrogates such elements to identify the communication requirements. Once these communication parameters are identified, root complex 104 establishes, e.g., through a negotiation process, the terms and conditions of the EGIO communication facilities for each element of the architecture.

In the EGIO architecture disclosed herein, switches selectively couple end-points within and between EGIO hierarchies and/or domains. According to one example implementation, an EGIO switch 108 has at least one upstream port (i.e., directed towards the root complex 104), and at least one downstream port. According to one implementation, a switch 108 distinguishes one port (i.e., a port of an interface or the interface 106 itself) which is closest to the host bridge as the upstream port, while all other port(s) are downstream ports. According to one implementation, switches 108 appear to configuration software (e.g., legacy configuration software) as a PCI-to-PCI bridge, and use PCI bridge mechanisms for routing transactions.

In the context of switches 108, peer-to-peer transactions are defined as transactions for which the receive port and the transmitting port are both downstream ports. According to one implementation, switches 108 support routing of all types of transaction layer packets (TLP) except those associated with a locked transaction sequence from any port to any other port. In this regard, all broadcast messages should typically be routed from the receiving port to all other ports on the switch 108. A transaction layer packet which cannot be routed to a port should typically be terminated as an unsupported TLP by the switch 108. Switches 108 typically do not modify transaction layer packet(s) (TLP) when transferring them from the receiving port to the transmitting port unless modification is required to conform to a different protocol requirement for the transmitting port (e.g., transmitting port coupled to a legacy bridge 114, 116).

It is to be appreciated that switches 108 act on behalf of other devices and, in this regard, do not have advance knowledge of traffic types and patterns. According to one implementation to be discussed more fully below, the flow control and data integrity aspects of the present invention are implemented on a per-link basis, and not on an end-to-end basis. Thus, in accordance with such an implementation, switches 108 participate in protocols used for flow control and data integrity. To participate in flow control, switch 108 maintains a separate flow control for each of the ports to improve performance characteristics of the switch 108. Similarly, switch 108 supports data integrity processes on a per-link basis by checking each TLP entering the switch using the TLP error detection mechanisms, described more fully below. According to one implementation, downstream ports of a switch 108 are permitted to form new EGIO hierarchy domains.

With continued reference to FIG. 1, an end-point 110 is defined as any device with a Type 00hex (00h) configuration space header. End-point devices 110 can be either a requester or a completer of an EGIO semantic transaction, either on its own behalf or on behalf of a distinct non-EGIO device. Examples of such end-points 110 include, but are not limited to, EGIO compliant graphics device(s), EGIO-compliant memory controller, and/or devices that implement a connection between EGIO and some other interface such as a universal serial bus (USB), Ethernet, and the like. Unlike a legacy bridge 114, 116 discussed more fully below, an end-point 110 acting as an interface for non-EGIO compliant devices may well not provide full software support for such non-EGIO compliant devices. While devices that connect a host processor complex 102 to the EGIO architecture are considered a root complex 104, it may well be the same device type as other end-points 110 located within the EGIO architecture distinguished only by its location relative to the processor complex 102.

In accordance with the teachings of the present invention, end-points 110 may be lumped into one or more of three categories, (1) legacy and EGIO compliant end-points, (2) legacy end-points, and (3) EGIO compliant end-points, each having different rules of operation within the EGIO architecture.

As introduced above, EGIO-compliant end-points 110 are distinguished from legacy end-points (e.g., 118, 120) in that an EGIO end-point 110 will have a type 00h configuration space header. Either of such end-points (110, 118 and 120) support configuration requests as a completer. Such end-points are permitted to generate configuration requests, and may be classified as either a legacy end-point or as an EGIO compliant end-point, but such classification may well require adherence to additional rules.

Legacy end-points (e.g., 118, 120) are permitted to support IO requests as a completer and are permitted to generate IO requests. Legacy end-points (118, 120) are permitted to generate lock semantics, e.g., in accordance with conventional PCI operation, as completers if that is required by their legacy software support requirements. Legacy end-points (118, 120) typically do not issue a locked request.

EGIO compliant end-points 110 typically do not support IO requests as a completer and do not generate IO requests. EGIO end-points 110 do not support locked requests as a completer, and do not generate locked requests as a requester.

EGIO-to-legacy bridges 114, 116 are specialized end-points 110 that include substantial software support, e.g., full software support, for the legacy devices (118, 120) they interface to the EGIO architecture. In this regard, an EGIO-legacy bridge 114, 116 typically has one upstream port (but may have more), with multiple downstream ports (but may just have one). Locked requests are supported in accordance with the legacy software model (e.g., the PCI software model). An upstream port of an EGIO-legacy bridge 114, 116 should support flow control on a per-link basis and adhere to the flow control and data integrity rules of the EGIO architecture, developed more fully below.

As used herein, communication link 112 is intended to represent any of a wide variety of communication media including, but not limited to, copper lines, optical lines, wireless communication channel(s), an infrared communication link, and the like. According to one example implementation, EGIO link 112 is a differential pair of serial lines, one pair each to support transmit and receive communications, thereby providing support for full-duplex communication capability. According to one implementation, the link provides a scalable serial clocking frequency with an initial (base) operating frequency of 2.5 GHz. The interface width, per direction, is scalable from x1, x2, x4, x8, x12, x16, x32 physical lanes. As introduced above and will be described more fully below, EGIO link 112 may well support multiple virtual channels between devices thereby providing support for uninterrupted communication of isochronous traffic between such devices using one or more virtual channels, e.g., one channel for audio and one channel for video.

Example EGIO Interface Architecture

Figure 2:
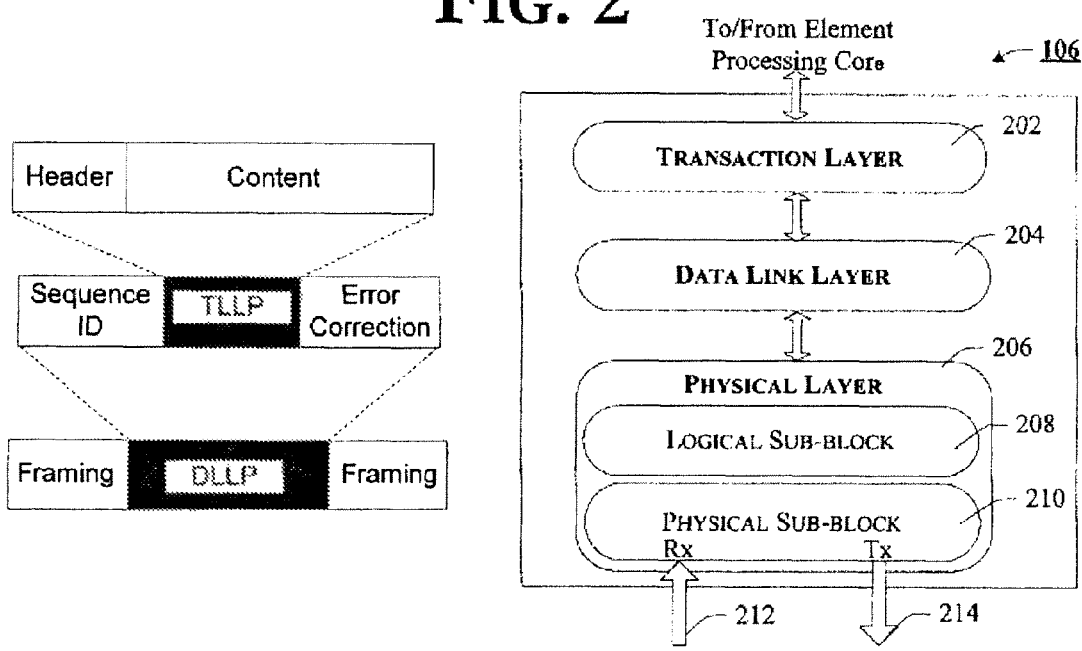
FIG. 2 is a graphical illustration of an example communication stack employed by one or more elements of the electronic appliance to facilitate communication between such elements, according to one example embodiment of the present invention.

In accordance with the illustrated example implementation of FIG. 2, the EGIO interface 106 may well be represented as a communication protocol stack comprising a transaction layer 202, a data link layer 204 and a physical layer 208. As shown, the physical link layer interface is depicted comprising a logical sub-block 210, and a physical sub-block, as shown, each of which will be developed more fully below.

Transaction Layer 202

In accordance with the teachings of the present invention, the transaction layer 202 provides an interface between the EGIO architecture and a device core. In this regard, a primary responsibility of the transaction layer 202 is the assembly and disassembly of packets (i.e., transaction layer packets, or TLPs) for one or more logical devices within a host device (or, agent).

Address Spaces, Transaction Types and Usage

Transactions form the basis for information transfer between an initiator agent and a target agent. According to one example embodiment, four address spaces are defined within the innovative EGIO architecture including, for example, a configuration address space, a memory address space, an input/output address space, and a message address space, each with its own unique intended usage (see, e.g., FIG. 7, developed more fully below).

Memory space (706) transactions include one or more of read requests and write requests to transfer data to/from a memory-mapped location. Memory space transactions may use two different address formats, e.g., a short address format (e.g., 32-bit address) or a long address format (e.g., 64-bits long). According to one example embodiment, the EGIO architecture provides for conventional read, modify, and write sequences using lock protocol semantics (i.e., where an agent may well lock access to modified memory space). More particularly, support for downstream locks are permitted, in accordance with particular device rules (bridge, switch, endpoint, legacy bridge). As introduced above, such lock semantics are supported in the support of legacy devices.

IO space (704) transactions are used to access input/output mapped memory registers within an IO address space (e.g., an 16-bit IO address space). Certain processors 102 such as Intel Architecture processors, and others, include n IO space definition through the processor's instructions set. Accordingly, IO space transactions include read requests and write requests to transfer data from/to an IO mapped location.

Configuration space (702) transactions are used to access configuration space of the EGIO devices. Transactions to the configuration space include read requests and write requests. In as much as conventional processors do not typically include a native configuration space, this space is mapped through a mechanism that is software compatible with convention PCI configuration space access mechanisms (e.g., using CFC/CFC8-based PCI configuration mechanism #1). Alternatively, a memory alias mechanism may well be used to access configuration space.

Message space (708) transactions (or, simply messages) are defined to support in-band communication between EGIO agents through interface(s) 106. Conventional processors do not include support for native message space, so this is enabled through EGIO agents within the EGIO interface 106. According to one example implementation, traditional "sideband" signals such as interrupts and power management requests are implemented as messages to reduce the pin count required to support such legacy signals. Some processors, and the PCI bus, include the concept of "special cycles," which are also mapped into messages within the EGIO interface 106. According to one embodiment, messages are generally divided into two categories: standard messages and vendor-defined messages.

In accordance with the illustrated example embodiment, standard messages include a general-purpose message group and a system management message group. General-purpose messages may be a single destination message or a broadcast/multicast message. The system management message group may well consist of one or more of interrupt control messages, power management messages, ordering control primitives, and error signaling, examples of which are introduced below.

According to one example implementation, the general purpose messages include messages for support of locked transaction. In accordance with this example implementation, an UNLOCK message is introduced, wherein switches (e.g., 108) should typically forward the UNLOCK message through any port which may be taking part in a locked transaction. End-point devices (e.g., 110, 118, 120) which receive an UNLOCK message when they are not locked will ignore the message. Otherwise, locked devices will unlock upon receipt of an UNLOCK message.

According to one example implementation, the system management message group includes special messages for ordering and/or synchronization. One such message is a FENCE message, used to impose strict ordering rules on transactions generated by receiving elements of the EGIO architecture. According to one implementation, such FENCE messages are only reacted to by a select subset of network elements, e.g., end-points. In addition to the foregoing, messages denoting a correctable error, uncorrectable error, and fatal errors are anticipated herein, e.g., through the use of tailer error forwarding discussed below.

According to one aspect of the present invention, introduced above, the system management message group provides for signaling of interrupts using in-band messages. According to one implementation, the ASSERT_INTx/DEASSERT_INTx message pair is introduced, wherein issuing of the assert interrupt message is sent to the processor complex through host bridge 104. In accordance with the illustrated example implementation, usage rules for the ASSERT_INTx/DEASSERT_INTx message pair mirrors that of the PCI INTx# signals found in the PCI specification, introduced above. From any one device, for every transmission of Assert_INTx, there should typically be a corresponding transmission of Deassert_INTx. For a particular 'x' (A, B, C or D), there should typically be only one transmission of Assert_INTx preceeding a transmission of Deassert_INTx. Switches should typically route Assert_INTx/Deassert_INTx messages to the root complex 104, wherein the root complex should typically track Assert_INTx/Deassert_INTx messages to generate virtual interrupt signals and map these signals to system interrupt resources.

In addition to the general purpose and system management message groups, the EGIO architecture establishes a standard framework within which core-logic (e.g., chipset) vendors can define their own vendor-defined messages tailored to fit the specific operating requirements of their platforms. This framework is established through a common message header format where encodings for vendor-defined messages are defined as "reserved".

Transaction Descriptor

A transaction descriptor is a mechanism for carrying transaction information from the origination point, to the point of service, and back. It provides an extensible means for providing a generic interconnection solution that can support new types of emerging applications. In this regard, the transaction descriptor supports identification of transactions in the system, modifications of default transaction ordering, and association of transaction with virtual channels using the virtual channel ID mechanism. A graphical illustration of a transaction descriptor is presented with reference to FIG. 3.

Figure 3:
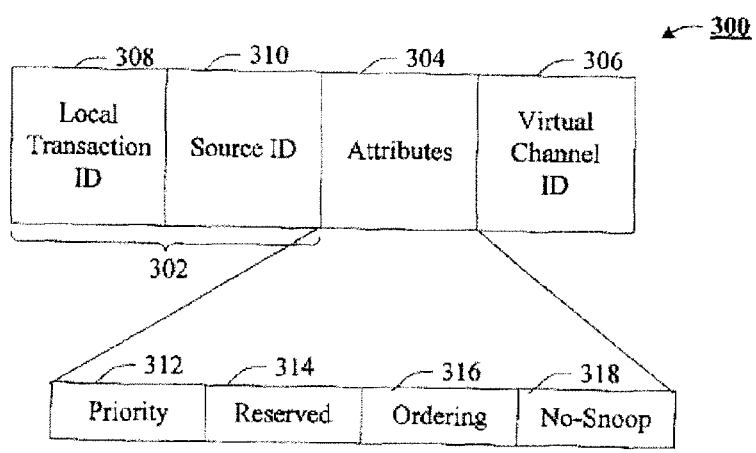
FIG. 3 is a graphical illustration of an example transaction layer datagram, in accordance with the teachings of the present invention.

Turning to FIG. 3, a graphical illustration of a datagram comprising an example transaction descriptor is presented, in accordance with the teachings of the present invention. In accordance with the teachings of the present invention, the transaction descriptor 300 is presented comprising a global identifier field 302, an attributes field 306 and a virtual channel identifier field 308. In the illustrated example implementation, the global identifier field 302 is depicted comprising a local transaction identifier field 308 and a source identifier field 310.

Global Transaction Identifier 302

As used herein, the global transaction identifier is unique for all outstanding requests. In accordance with the illustrated example implementation of FIG. 3, the global transaction identifier 302 consists of two sub-fields: the local transaction identifier field 308 and a source identifier field 310. According to one implementation, the local transaction identifier field 308 is an eight-bit field generated by each requester, and it is unique for all outstanding requests that require a completion for that requester. The source identifier uniquely identifies the EGIO agent within the EGIO hierarchy. Accordingly, together with source ID the local transaction identifier field provides global identification of a transaction within a hierarchy domain.

According to one implementation, the local transaction identifier 308 allows requests/completions from a single source of requests to be handled out of order (subject to the ordering rules developed more fully below). For example, a source of read requests can generate reads A1 and A2. The destination agent that services these read requests may return a completion for request A2 transaction ID first, and then a completion for A1 second. Within the completion packet header, local transaction ID information will identify which transaction is being completed. Such a mechanism is particularly important to appliances that employ distributed memory systems since it allows for handling of read requests in a more efficient manner. Note that support for such out-of-order read completions assumes that devices that issue read requests will ensure pre-allocation of buffer space for the completion. As introduced above, insofar as EGIO switches 108 are not end-points (i.e., merely passing completion requests to appropriate end-points) they need not reserve buffer space.

A single read request can result in multiple completions. Completions belonging to single read request can be returned out-of-order with respect to each other. This is supported by providing the address offset of the original request that corresponds to partial completion within a header of a completion packet (i.e., completion header).

According to one example implementation, the source identifier field 310 contains a 16-bit value that is unique for every logical EGIO device. Note that a single EGIO device may well include multiple logical devices. The source ID value is assigned during system configuration in a manner transparent to the standard PCI bus enumeration mechanism. EGIO devices internally and autonomously establish a source ID value using, for example, bus number information available during initial configuration accesses to those devices, along with internally available information that indicates, for example, a device number and a stream number. According to one implementation, such bus number information is generated during EGIO configuration cycles using a mechanism similar to that used for PCI configuration. According to one implementation, the bus number is assigned by a PCI initialization mechanism and captured by each device. In the case of Hot Plug and Hot Swap devices, such devices will need to re-capture this bus number information on every configuration cycle access to enable transparency to hot plug controller (e.g., a standard hot plug controller (SHPC)) software stacks.

In accordance with one implementation of the EGIO architecture, a physical component may well contain one or more logical devices (or, agents). Each logical device is designed to respond to configuration cycles targeted at its particular device number, i.e., the notion of device number is embedded within the logical device. According to one implementation, up to sixteen logical devices are allowed in a single physical component. Each of such logical devices may well contain one or more streaming engines, e.g., up to a maximum of sixteen. Accordingly, a single physical component may well comprise up to 256 streaming engines.

Transactions tagged by different source identifiers belong to different logical EGIO input/output (IO) sources and can, therefore, be handled completely independently from each other from an ordering point of view. In the case of a three-party, peer-to-peer transactions, a fence ordering control primitive can be used to force ordering if necessary.

As used herein, the global transaction identifier field 302 of the transaction descriptor 300 adheres to at least a subset of the following rules:
 (a) each Completion Required Request is tagged with a global transaction ID (GTID);
 (b) all outstanding Completion Required Requests initiated by an agent should typically be assigned a unique GTID;
 (c) non-Completion Required Requests do not use the local transaction ID field 308 of the GTID, and the local transaction ID field is treated as Reserved;
 (d) the target does not modify the requests GTID in any way, but simply echoes it in the header of a completion packet for all completions associate with the request, where the initiator used the GTID to match the completion(s) to the original request.

Attributes Field 304

As used herein, the attributes field 304 specifies characteristics and relationships of the transaction. In this regard, the attributes field 304 is used to provide additional information that allows modification of the default handling of transactions. These modifications may apply to different aspects of handling of the transactions within the system such as, for example, ordering, hardware coherency management (e.g., snoop attributes) and priority. An example format for the attributes field 304 is presented with sub-fields 312-318.

As shown, the attribute field 304 includes a priority sub-field 312. The priority sub-field may be modified by an initiator to assign a priority to the transaction. In one example implementation, for example, class or quality of service characteristics of a transaction or an agent may be embodied in the priority sub-field 312, thereby affecting processing by other system elements.

The reserved attribute field 314 is left reserved for future, or vendor-defined usage. Possible usage models using priority or security attributes may be implemented using the reserved attribute field.

The ordering attribute field 316 is used to supply optional information conveying the type of ordering that may modify default ordering rules within the same ordering plane (where the ordering plane encompasses the traffic initiated by the host processor (102) and the IO device with its corresponding source ID). According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Devices that use relaxed ordering semantics primarily for moving the data and transactions with default ordering for reading/writing status information.

The snoop attribute field 318 is used to supply optional information conveying the type of cache coherency management that may modify default cache coherency management rules within the same ordering plane, wherein an ordering plane encompasses traffic initiated by a host processor 102 and the IO device with its corresponding source ID). In accordance with one example implementation, a snoop attribute field 318 value of "0" corresponds to a default cache coherency management scheme wherein transactions are snooped to enforce hardware level cache coherency. A value of "1" in the snoop attribute field 318, on the other hand, suspends the default cache coherency management schemes and transactions are not snooped. Rather, the data being accessed is either non-cacheable or its coherency is being managed by software.

Virtual Channel ID Field 306

As used herein, the virtual channel ID field 306 identifies an independent virtual channel to which the transaction is associated. According to one embodiment, the virtual channel identifier (VCID) is a four-bit field that allows identification of up to sixteen virtual channels (VCs) on a per-transaction basis. An example of VC ID definitions are provided in table 1, below:

TABLE I

Virtual Channel ID Encoding

| VC ID | VC Name | Usage Model |
|---|---|---|
| 0000 | Default Channel | General Purpose Traffic |
| 0001 | Isochronous Channel | This channel is used to carry IO traffic that has the following requirements: (a) IO traffic is not snooped to allow for deterministic service timing; and (b) quality of service is controlled using an X/T contract (where X = amount of data, and T = time) |
| 0010-1111 | Reserved | Future Use |

Virtual Channels

In accordance with one aspect of the present invention, the transaction layer 202 of the EGIO interface 106 supports the establishment and use of virtual channel(s) within the bandwidth of the EGIO communication link 112. The virtual channel (VC) aspect of the present invention, introduced above, is used to define separate, logical communication interfaces within a single physical EGIO link 112 based on the required independence of the content to be communicated over the channel. In this regard, virtual channels may well be established based on one or more characteristics, e.g., bandwidth requirements, class of service, type of service (e.g., system service channel), etc.

The combination of virtual channel(s) and traffic (or, transaction) class identifiers is provided to support differentiated services and Quality of Service (QoS) support for certain class of applications. As used herein, a traffic (or, transaction) class is a transaction layer packet label that is transmitted unmodified end-to-end through the EGIO fabric. At every service point (e.g., switches, root complex, etc.) the traffic class labels are used by the service point to apply the appropriate servicing policies. In this regard, separate VCs are used to map traffic that would benefit from different handling policies and servicing priorities. For example, traffic that requires deterministic quality of service, in terms of guaranteeing X amount of data transferred within T period of time, can be mapped to an isochronous (or, time coordinated) virtual channel. Transactions mapped to different virtual channels may not have any ordering requirements with respect to each other. That is, virtual channels operate as separate logical interfaces, having different flow control rules and attributes.

According to one example implementation, each EGIO communication port (input or output) of an EGIO-compliant element includes a port capability data structure (not specifically depicted). Information regarding the capability of the port including one or more of (a) the number of virtual channels supported by the port, (b) the traffic classes associated with each of the virtual channels, (c) a port VC status register, (d) a port VC control register, and (e) the arbitration scheme associated with such virtual channels is maintained in the port capability data structure. According to one example implementation, the communication operating parameters and, by association, the port capability parameters are negotiated between coupled elements on a per-link, per-VC basis.

With respect to traffic initiated by host processor 102, virtual channels may require ordering control based on default order mechanism rules, or the traffic may be handled completely out of order. According to one example implementation, VCs comprehend the following two types of traffic: general purpose IO traffic, and Isochronous traffic. That is, in accordance with this example implementation, two types of virtual channels are described: (1) general purpose IO virtual channels, and (2) isochronous virtual channels.

As used herein, transaction layer 202 maintains independent flow control for each of the one or more virtual channel(s) actively supported by the component. As used herein, all EGIO compliant components should typically support a default general IO type virtual channel, e.g., virtual channel 0, a "best effort" class of service where there are no ordering relationships required between disparate virtual channels of this type. By default, VC 0 is used for general purpose IO traffic, while VC 1 or higher (e.g., VC1-VC7) are assigned to handle Isochronous traffic. In alternate implementations, any virtual channel may be assigned to handle any traffic type. A conceptual illustration of an EGIO link comprising multiple, independently managed virtual channels is presented with reference to FIG. 4.

Figure 4:
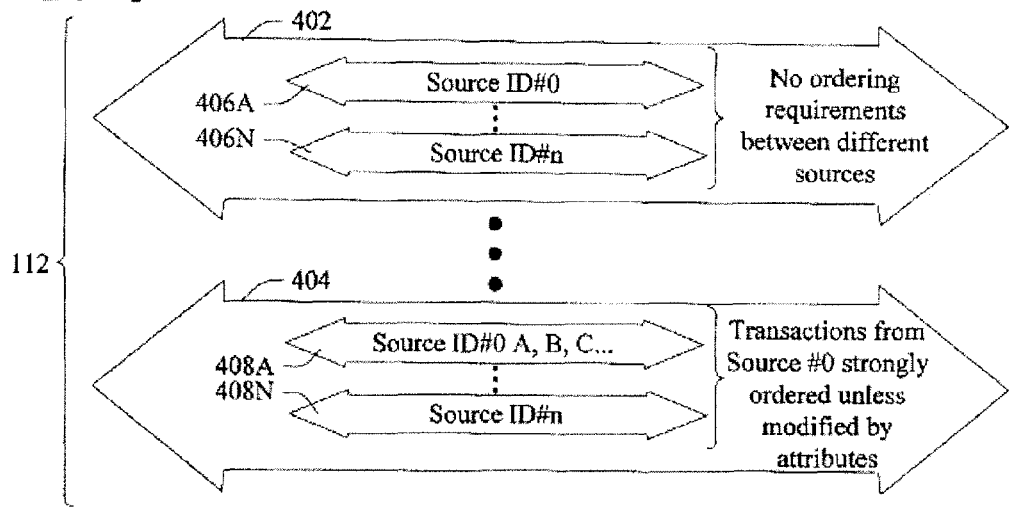
FIG. 4 is a graphical illustration of an example communication link comprising one or more virtual channels to facilitate communication between one or more elements of the electronic device, according to one aspect of the invention.

Turning to FIG. 4, a graphical illustration of an example EGIO link 112 is presented comprising multiple virtual channels (VC), according to one aspect of the present invention. In accordance with the illustrated example implementation of FIG. 4, EGIO link 112 is presented comprising multiple virtual channels 402, 404 created between EGIO interface(s) 106. According to one example implementation, with respect to virtual channel 402, traffic from multiple sources 406A . . . N are illustrated, differentiated by at least their source ID. As shown, virtual channel 402 was established with no ordering requirements between transactions from different sources (e.g., agents, interfaces, etc.).

Similarly, virtual channel 404 is presented comprising traffic from multiple sources multiple transactions 408A . . . N wherein each of the transactions are denoted by at least a source ID. In accordance with the illustrated example, transactions from source ID 0 406A are strongly ordered unless modified by the attributes field 304 of the transaction header, while the transactions from source 408N depict no such ordering rules.

Isochronous Channels

As introduced above, isochronous channels are established to communicate time sensitive content (e.g., the streaming of multimedia content) between a requester agent and completer agent(s) in the EGIO architecture of the electronic appliance 100. According to one example implementation, two different isochronous communication paradigms exist within the EGIO architecture, e.g., an endpoint-to-root complex model and a peer-to-peer (or, endpoint-to-endpoint) communication model.

In the endpoint-to-root complex model, the primary isochronous traffic is memory read and write requests to the root complex 104 and read completions from the root complex 104. In the peer-to-peer model, isochronous traffic is limited to unicast, push-only transactions (e.g., posted transactions such as memory writes, or messages). The push-only transactions can be within a single host domain or across multiple host domains.

In order to support isochronous data transfer with guaranteed bandwidth and deterministic service latency, an isochronous "contract" is established between the requester/completer pair and the EGIO communication fabric. According to one embodiment, the "contract" will enforce resource reservation and traffic regulation to prevent over-subscription and congestion on the virtual channel.

An example method for establishing and managing an isochronous communication channel within the EGIO architecture is presented with reference to FIG. 5. In accordance with the illustrated example embodiment of FIG. 5, the method begins with block 502, wherein the communication capabilities of the one or more elements of the EGIO fabric (i.e., root complex 104, switches 108, end-points 110, links 112, bridges 114, etc.) is identified.

According to one example implementation, the communication capability of at least a subset of the EGIO fabric is exposed to a bandwidth manager of the root complex 104, which manages allocation of isochronous communication resources within the EGIO architecture. Exposure of the communication capability of an element occurs during an initialization period of the element, e.g., at start-up of the host electronic appliance 100, or upon the hot-plug of an EGIO compliant device to the host electronic appliance. According to one embodiment, the information exposed (e.g., from a data structure within the EGIO agent 106) includes one or more of port identification, port allocation, virtual channel assignment(s), bandwidth capability, etc. This information is maintained in a data structure accessible by bandwidth manager for use in developing isochronous contracts, as detailed more fully below.

During the course of normal operation of the electronic appliance 100, it may become necessary or desirable to establish an isochronous communication channel between two (or more) agents within comprising the appliance 100. In such an instance, bandwidth manager of root complex 104 receives a request for isochronous communication resources within the EGIO fabric from (or, on behalf of) a requester/completer pair, block 504. As used herein, the request includes an indication of the desired communication resources, e.g., bandwidth and service latency requirements.

In block 506, upon receiving the request for isochronous communication resources, the bandwidth manager of root complex 104 analyzes the available communication resources of at least an appropriate subset of the EGIO architecture to determine, in block 508, whether the request for isochronous communication resources can be accommodated. According to one embodiment, bandwidth manager of root complex 104 analyzes information associated with the ports 106, switch(es) 108, link(s) 112, etc. comprising the communication path between the requester and the completer to determine whether the bandwidth and service latency requirements of the isochronous communication request can be met. In alternate embodiments, the requester/completer pair merely establishes the isochronous contract (or, negotiated agreement as to operating parameters) among themselves, and any intervening elements on a link-by-link basis.

If, in block 508 bandwidth manager of root complex 104 determines that the requested communication resources are not available, root complex 104 rejects the request for the isochronous channel, and may provide an indication that the requested resources are not available, block 510. According to certain embodiments, an indication of the available resources may well be provided to the requester/completer pair, which may then decide to reissue the request for isochronous communication resources, albeit in accordance with the denoted available resources. In an alternate embodiment, a bandwidth manager will notify the entity that requested the resource that certain bandwidth (that might be less then requested) is allocated. In this case requesting entity would not need to re-issue the request.

According to one example embodiment, in determining whether the request for isochronous communication resources can be met, and in establishing the isochronous contract in block 512, bandwidth manager of root complex 104 computes the bandwidth requirements of the requester/completer pair as follows:

$$BW=(N*Y)/T \qquad [1]$$

The formula defines allocated bandwidth (BW) as a function of specified number (N) of transactions of a specified payload size (Y) within a specified time period (T).

Another important parameter in the isochronous contract is latency. Based on the contract, isochronous transactions are to be completed within a specified latency (L). Once a requester/completer pair is admitted by the bandwidth manager for isochronous communication, under normal operation conditions, the bandwidth and latency are guaranteed to the requester by the completer and by any intervening EGIO architecture element (e.g., switches, link(s), root complex, etc.).

Accordingly, the isochronous contract developed in block 512 defines specific service disciplines implemented by the EGIO interface(s) 106 participating in the isochronous communication within the EGIO architecture. The service disciplines are imposed to EGIO switches 108 and completers (e.g., endpoints 110, root complex 104, etc.) in such a manner that the service of isochronous requests is subject to a specific service interval (t). This mechanism is used to provide the method of controlling when an isochronous packet injected by a requester is serviced.

Consequently, isochronous traffic is policed, block 514, in such a manner that only packets that can be injected into the EGIO architecture in compliance with the negotiated isochronous contract are allowed to make immediate progress and start being serviced by the EGIO architecture elements. A non-compliant requester that attempts to inject more isochronous traffic than is allowed per the negotiated contract is prevented from doing so by a flow control mechanism, described more fully below (see, e.g., the data link layer feature set).

According to one example implementation, the isochronous time period (T) is uniformly divided into units of virtual timeslots (t). Up to one isochronous request is allowed within a virtual timeslot. According to one embodiment, the size (or, duration) of the virtual timeslot supported by an EGIO component is provided as header information within a data structure of the EGIO interface. In alternate implementations, the size of the virtual timeslot is reported to through a broadcast message from the EGIO component upon receipt of an initialization event (e.g., cold start, reset, etc.). In another alternate implementation, the size of the virtual timeslot is reported through a special information message from the EGIO component upon receipt of a special request message. In yet another alternate implementation the size of virtual timeslot can be fixed and isochronous bandwidth manager software can interleave active and inactive slots (during bandwidth assignment) in a manner that it effectively creates a "wider" timeslots.

According to one embodiment, the duration of the virtual timeslot (t) is 100 ns. The duration of the isochronous time period (T) depends on the number of phases of the supported time-based arbitration scheme (e.g., the time-based weighted round-robin (WRR) (or, weighted sequential)). According to one embodiment, the number of phases is defined by the number of isochronous virtual timeslots, denoted by the number of entries in a port arbitration table maintained within each element. When the port arbitration table size equals 128, there are 128 virtual timeslots (t) available in an isochronous time period, i.e., T=12.8 µs.

According to one example embodiment, a maximum payload size (Y) for isochronous transactions is established during the EGIO configuration period. After configuration, the max payload size is fixed within a given EGIO hierarchy domain. The fixed max payload size value is used for isochronous bandwidth budgeting regardless of the actual size of data payload associated with isochronous transactions between a requester/completer.

Given the discussion of isochronous period (T), virtual timeslots (t) and maximum payload (Y), the maximum number of virtual timeslots within a time period is:

$$N_{max}=T/t. \quad [2]$$

And the maximum specifiable isochronous bandwidth is:

$$BW_{max}=Y/t. \quad [3]$$

The granularity with which isochronous bandwidth can be allocated is therefore defined as:

$$BW_{granularity}=Y/T. \quad [4]$$

Assigning isochronous bandwidth $BW_{link}$ to a communication link 112 is akin to assigning $N_{link}$ virtual timeslots per isochronous period (T), were $N_{link}$ is given by:

$$N_{link}=BW_{link}/BW_{granularity} \quad [5]$$

To maintain regulated access to the link, a port of the switch serving as an egress port for isochronous traffic establishes a data structure (e.g., the port arbitration table, introduced above) populated with up to $N_{max}$ entries, where $N_{max}$ is the maximum number of isochronous sessions permissible given the link bandwidth, granularity and latency requirements. An entry in the table represents one virtual timeslot in the isochronous time period (T). When a table entry is given a value of a port number (PN) it means that the timeslot is assigned to an ingress port designated by the port number. Therefore, $N_{link}$ virtual timeslots are assigned to the ingress port when there are $N_{link}$ entries in the port arbitration table given the value of PN. The egress port may admit one isochronous request transaction from the ingress port for further service only when the table entry reached by the Egress Port's isochronous time counter (that increments by one (1) every t time and wraps around when reaching T) is set to PN. Even if there are outstanding isochronous requests ready in the ingress port, they will not be served until a next round of arbitration (e.g., time-based, weighted round-robin (WRR) arbitration). In this manner, the time-based port arbitration data structure serves for both isochronous bandwidth assignment and traffic regulation.

As used herein, the transaction latency discussed above is composed of the latency through the EGIO fabric and the latency contributed by the completer. Isochronous transaction latency is defined for each transaction and measured in units of virtual timeslot t.

For a requester in the endpoint-to-root complex communication model, the read latency is defined as the round-trip latency, i.e., the delay from the time when the device submits a memory read request packet to its transaction layer (on the transmit side) to the time when the corresponding read completion arrives at the device's transaction layer (receive side). For a requester in either communication model, the write latency is defined as the delay from the time when the requester posts a memory write request to the transmit side of its transaction layer to the time when the data write becomes globally visible within the memory subsystem of the completer. A write to memory reaches the point of global visibility when all agents accessing that memory address get the updated data.

As part of the isochronous contract, an upper bound and a lower bound of isochronous transaction latency are provided. The size of isochronous data buffers in a requester can be determined using the minimum and maximum isochronous transaction latencies. As developed more fully below, the minimum isochronous transaction latency is much smaller than the maximum isochronous transaction latency.

For a requester, the maximum isochronous (read or write) transaction latency (L) can be accounted for in accordance with equation (6) below, $$L=L_{fabric}+L_{completer} \quad [6]$$

where $L_{fabric}$ is the maximum latency of the EGIO fabric, and $L_{completer}$ is the maximum latency of the completer.

Transaction latency for an EGIO link 112 or the EGIO fabric is defined as the delay from the time a transaction is posted at the transmission end to the time it is available at the receiving end. This applies to both read and write transactions. In this regard, $L_{fabric}$ depends on the topology, latency due to each link 112 and arbitration point in the path from requester to completer.

With continued reference to FIG. 5, the process continues with block 516 wherein bandwidth manager determines whether the use of an isochronous communication channel is complete. That is, bandwidth manager determines whether the isochronous communication session has ended and, accordingly, whether the virtual channel resources allocated to support the isochronous channel can be released for use by the EGIO fabric. According to one embodiment, bandwidth manager receives an indication from one or more of the requester/completer pair that the isochronous resources are no longer required. In an alternate embodiment, after a certain period of inactivity, bandwidth manager concludes that the isochronous communications have completed.

If, in block 516, bandwidth manager determines that the isochronous communication has not ended, the process continues with block 514.

Alternatively, the process continues with block 518 wherein bandwidth manager cancels the isochronous contract, thereby releasing such bandwidth to the support of the remaining virtual channels. According to one embodiment, bandwidth manager informs one or more other elements of the EGIO architecture that the isochronous contract is no longer enforced.

Transaction Ordering

Although it may be simpler to force all responses to be processed in-order, transaction layer 202 attempts to improve performance by permitting transaction re-ordering. To facilitate such re-ordering, transaction layer 202 "tags" transactions. That is, according to one embodiment, transaction layer 202 adds a transaction descriptor to each packet such that its transmit time may be optimized (e.g., through re-ordering) by elements in the EGIO architecture, without losing track of the relative order in which the packet was originally processed. Such transaction descriptors are used to facilitate routing of request and completion packets through the EGIO interface hierarchy.

Thus, one of the innovative aspects of the EGIO interconnection architecture and communication protocol is that it provides for out of order communication, thereby improving data throughput through reduction of idle or wait states. In this regard, the transaction layer 202 employs a set of rules to define the ordering requirements for EGIO transactions. Transaction ordering requirements are defined to ensure correct operation with software designed to support the producer-consumer ordering model while, at the same time, allowing improved transaction handling flexibility for application based on different ordering models (e.g., relaxed ordering for graphics attach applications). Ordering requirements for two different types of models are presented below, a single ordering plane model and a multiple ordering plane model.

Basic Transaction Ordering—Single "Ordering Plane" Model

Assume that two components are connected via an EGIO architecture similar to that of FIG. 1: a memory control hub that provides an interface to a host processor and a memory subsystem, and an IO control hub that provides interface to an IO subsystem. Both hubs contain internal queues that handle inbound and outbound traffic and in this simple model all IO traffic is mapped to a single "ordering plane". (Note that Transaction Descriptor Source ID information provides a unique identification for each Agent within an EGIO Hierarchy. Note also that IO traffic mapped to the Source ID can carry different Transaction ordering attributes). Ordering rules for this system configuration are defined between IO-initiated traffic and host-initiated traffic. From that perspective IO traffic mapped to a Source ID together with host processor initiated traffic represent traffic that is conducted within a single "ordering plane".

An example of such transaction ordering rules are provided below with reference to Table II. The rules defined in this table apply uniformly to all types of Transactions in the EGIO system including Memory, IO, Configuration and Messages. In Table II, below, the columns represent the first of two Transactions, and the rows represent the second. The table entry indicates the ordering relationship between the two Transactions. The table entries are defined as follows:

TABLE II

Transaction Ordering and Deadlock Avoidance for Single Ordering Plane

| Row pass Column? | WR_Req (No compl. Req) (col. 2) | RD_Req (col. 3) | WR_Req (compl. Req) (col. 4) | RD_Comp. (col. 5) | WR_Comp (col. 6) |
|---|---|---|---|---|---|
| WR_Req No comp Req (Row A) | NO | YES | a. NO b. YES | Y/N | Y/N |
| RD_Req (Row B) | NO | a. NO b. Y/N | Y/N | Y/N | Y/N |
| WR_Req (comp. Req) (Row C) | NO | Y/N | a. NO b. Y/N | Y/N | Y/N |
| RD_Comp. (Row D) | NO | YES | YES | a. NO b. Y/N | Y/N |
| WR_Comp. (Row E) | Y/N | YES | YES | Y/N | Y/N |

Yes - the second Transaction should typically be allowed to pass the first to avoid deadlock. (When blocking occurs, the second Transaction is required to pass the first Transaction. Fairness should typically be comprehended to prevent starvation).
Y/N - there are no requirements. The first Transaction may optionally pass the second Transaction or be blocked by it.
No - the second Transaction should typically not be allowed to pass the first Transaction. This is required to preserve strong ordering.

TABLE III

Transaction Ordering Explanations

| Row: Column ID | Explanation of Table II Entry |
|---|---|
| A2 | A posted memory write request (WR_REQ) should typically not pass any other posted memory write request |
| A3 | A posted memory write request should typically be allowed to pass read requests to avoid deadlocks |
| A4 | a. A posted memory WR_REQ should typically not be allowed to pass a memory WR_REQ with a completion required attribute.<br>b. A posted memory WR_REQ should typically be allowed to pass IO and Configuration Requests to avoid deadlocks |
| A5, A6 | A posted memory WR_REQ is not required to pass completions. To allow this implementation flexibility while still guaranteeing deadlock free operation, the EGIO communication protocol provides that agents guarantee acceptance of completions |
| B2, C2 | These requests cannot pass a posted memory WR_REQ, thereby preserving strong write ordering required to support producer/consumer usage model. |
| B3 | a. In a base implementation (i.e., no out of order processing) read requests are not permitted to pass each other.<br>b. In alternate implementations, read request permitted to pass each other. Transaction identification is essential for providing such functionality. |
| B4, C3 | Requests of different types are permitted to be blocked by or to be passed by each other. |
| B5, B6, C5, C6 | These requests are permitted to be block by or to pass completions. |
| D2 | Read completions cannot pass a posted memory WR_Req (to preserve strong write ordering). |

TABLE III-continued

Transaction Ordering Explanations

| Row: Column ID | Explanation of Table II Entry |
|---|---|
| D3, D4, E3, E4 | Completions should typically be allowed to pass non-posted requests to avoid deadlocks |
| D5 | a. In a base implementation, read completions are not permitted to pass each other;<br>b. In alternate implementations, read completions are permitted to pass each other. Again, the need for strong transaction identification may well be required. |
| E6 | These completions are permitted to pass each other. Important to maintain track of transactions using, e.g., transaction ID mechanism |
| D6, E5 | Completions of different types can pass each other. |
| E2 | Write completions are permitted to e blocked by or to pass posted memory WR_REQ. Such write transactions are actually moving in the opposite direction and, therefore, have no ordering relationship |

Advanced Transaction Ordering—"Multi-Plane" Transaction Ordering Model The previous section defined ordering rules within a single "ordering plane". As introduced above, the EGIO interconnection architecture and communication protocol employs a unique Transaction Descriptor mechanism to associate additional information with a transaction to support more sophisticated ordering relationships. Fields in the Transaction Descriptor allow the creation of multiple "ordering planes" that are independent of each other from an IO traffic ordering point of view.

Each "ordering plane" consists of queuing/buffering logic that corresponds to a particular IO device (designated by a unique Source ID) and of queuing/buffering logic that carries host processor initiated traffic. The ordering within the "plane" is typically defined only between these two. The rules defined in the previous Section to support the Producer/Consumer usage model and to prevent deadlocks are enforced for each "ordering plane" independent of other "ordering planes". For example, read Completions for Requests initiated by "plane" N can go around Read Completions for Requests initiated by "plane" M. However, neither Read Completions for plane N nor the ones for plane M can go around Posted Memory Writes initiated from the host.

Although use of the plane mapping mechanism permits the existence of multiple ordering planes, some or all of the ordering planes can be "collapsed" together to simplify the implementation (i.e. combining multiple separately controlled buffers/FIFOs into a single one). When all planes are collapsed together, the Transaction Descriptor Source ID mechanism is used only to facilitate routing of Transactions and it is not used to relax ordering between independent streams of IO traffic.

In addition to the foregoing, the transaction descriptor mechanism provides for modifying default ordering within a single ordering plane using an ordering attribute. Modifications of ordering can, therefore, be controlled on per-transaction basis.

Transaction Layer Protocol Packet Format

As introduced above, the innovative EGIO architecture uses a packet based protocol to exchange information between transaction layers of two devices that communicate with one another. The EGIO architecture generally supports the Memory, IO, Configuration and Messages transaction types. Such transactions are typically carried using request or completion packets, wherein completion packets are only used when required, i.e., to return data or to acknowledge receipt of a transaction.

Figures 9, 10:
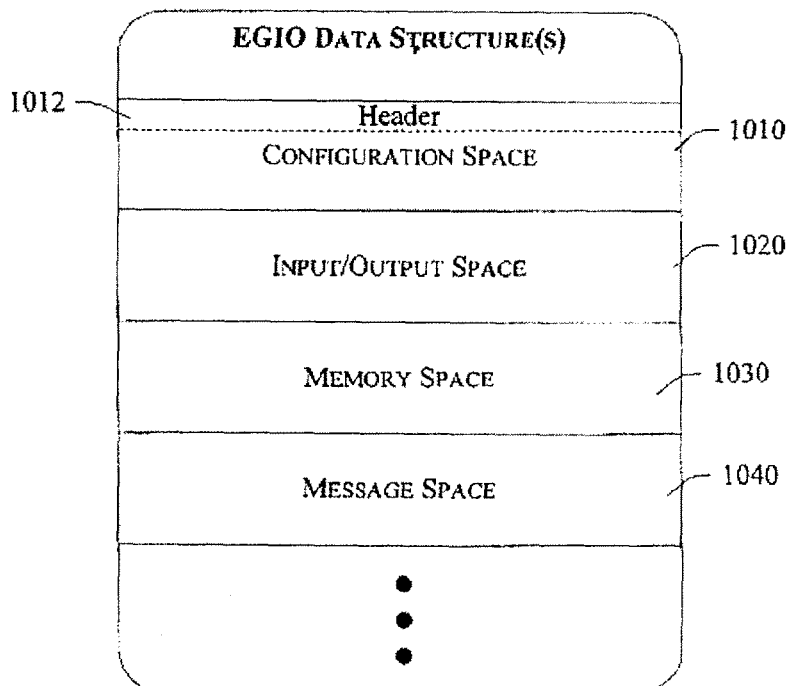
FIG. 9 is a block diagram of various packet header formats used within the transaction layer of the present invention.
FIG. 10 is a block diagram of an example memory architecture employed to facilitate one or more aspects of the present invention, according to an example embodiment of the present invention.

With reference to FIG. 9 a graphical illustration of an example transaction layer protocol is presented, in accordance with the teachings of the present invention. In accordance with the illustrated example implementation of FIG. 9, TLP header 900 is presented comprising a format field, a type field, an extended type/extended length (ET/EL) field, and a length field. Note that some TLPs include data following the header as determined by the format field specified in the header. No TLP should include more data than the limit set by MAX_PAYLOAD_SIZE. In accordance with one example implementation, TLP data is four-byte naturally aligned and in increments of a four-byte double word (DW).

As used herein, the format (FMT) field specifies the format of the TLP, in accordance with the following definitions:

000-2DW Header, No Data 001-3DW Header, No Data 010-4DW Header, No Data 101-3DW Header, With Data 110-4DW Header, With Data All Other Encodings are Reserved The TYPE field is used to denote the type encodings used in the TLP. According to one implementation, both Fmt[2:0] and Type[3:0] should typically be decoded to determine the TLP format. According to one implementation, the value in the type[3:0] field is used to determine whether the extended type/extended length field is used to extend the Type field or the Length field. The ET/EL field is typically only used to extend the length field with memory-type read requests.

The length field provides an indication of the length of the payload, again in DW increments of:

:0000 0000=1DW

:0000 0001=2DW

: . . . .

:1111 1111=256DW

A summary of at least a subset of example TLP transaction types, their corresponding header formats, and a description is provided below, in Table IV:

TABLE IV

TLP Type Summary

| TLP Type | FMT [2:0] | Type [3:0] | Et [1:0] | Description |
|---|---|---|---|---|
| Initial FCP | 000 | 0000 | 00 | Initial flow control information |
| Update FCP | 000 | 0001 | 00 | Update flow control information |
| MRd | 001 010 | 1001 | E19 E18 | Memory read request Et/E1 field used for length [9:8] |
| MRdLK | 001 010 | 1011 | 00 | Memory read request - locked |
| MWR | 101 110 | 0001 | 00 | Memory Write request - posted |
| IORd | 001 | 1010 | 00 | IO Read request |
| IOWr | 101 | 1010 | 00 | IO Write request |
| CfgRd0 | 001 | 1010 | 01 | Configuration read type 0 |
| CfgWr0 | 101 | 1010 | 01 | Configuration write type 0 |
| CfgRd1 | 001 | 1010 | 11 | Configuration read type 1 |
| CfgWr1 | 101 | 1010 | 11 | Configuration write type 1 |
| Msg | 010 | 011s2 | s1s0 | Message request - the sub-field s[2:0] specify a group of messages. According to one implementation, the message field is decoded to determine specific cycle including if a completion is required |
| MsgD | 110 | 001s2 | s1s0 | Message request with data - the sub-field s[2:0] specify a group of messages. According to one implementation, the message field is decoded to determine specific cycle including if a completion is required |
| MsgCR | 010 | 111s2 | s1s0 | Message request completion required - The sub-fields s[2:0] specify a group of messages. According to one implementation, the message field is decoded to determine specific cycle |
| MsgDCR | 110 | 111s2 | s1s0 | Message request with data completion required - The sub-fields s[2:0] specify a group of messages. According to one implementation, the Special Cycle field is decided to determine specific cycle. |
| CPL | 001 | 0100 | 00 | Completion without data - used for IO and configuration write completions, some message completions, and memory read completions with completion status other than successful completion. |
| CplD | 101 | 0100 | 00 | Completion with data - used for memory, IO, and configration read completions, and some message completions. |
| CplDLk | 101 | 001 | 01 | Completion for locked memory read - otherwise like CplD |

Additional detail regarding requests and completions is provided in Appendix A, the specification of which is hereby expressly incorporated herein by reference.

Flow Control

One of the limitations commonly associated with conventional flow control schemes is that they are reactive to problems that may occur, rather than proactively reducing the opportunity for such problems to occur in the first place. In the conventional PCI system, for example, a transmitter will send information to a receiver until it receives a message to halt/suspend transmission until further notice. Such requests may subsequently be followed by requests for retransmission of packets starting at a given point in the transmission. Moreover, insofar as such flow control mechanisms are hardware based, they are not suitable for application to dynamically established, independent managed virtual channels described above. Those skilled in the art will appreciate that this reactive approach results in wasted cycles and can, in this regard, be inefficient.

To address this limitation, the transaction layer 202 of the EGIO interface 106 includes a flow control mechanism that proactively reduces the opportunity for overflow conditions to arise, while also providing for adherence to ordering rules on a per-link basis of the virtual channel established between an initiator and completer(s).

In accordance with one aspect of the present invention, the concept of a flow control "credit" is introduced, wherein a receiver shares information about (a) the size of the buffer (in credits), and (b) the currently available buffer space with a transmitter for each of the virtual channel(s) established between the transmitter and the receiver (i.e., on a per-virtual channel basis). This enables the transaction layer 202 of the transmitter to maintain an estimate of the available buffer space (e.g., a count of available credits) allocated for transmission through an identified virtual channel, and proactively throttle its transmission through any of the virtual channels if it determines that transmission would cause an overflow condition in the receive buffer.

In accordance with one aspect of the present invention, the transaction layer 202 selectively invokes flow control to prevent overflow of a receive buffer associated with a virtual channel and to enable compliance with the ordering rules, introduced above. In accordance with one implementation, the flow control mechanism of the transaction layer 202 is used by a transmitter to track the queue/buffer space available in an agent (receiver) across the EGIO link 112. In this regard, unlike conventional flow control mechanisms, the transmitter, not the receiver, is responsible for determining when the receiver is temporarily unable to receive more content via the virtual channel. As used herein, flow control does not imply that a request has reached its ultimate completer.

Within the EGIO architecture, flow control is orthogonal to the data integrity mechanisms used to implement reliable information exchange between a transmitter and a receiver. That is, flow control can treat the flow of transaction layer packet (TLP) information from transmitter to receiver as perfect, since the data integrity mechanisms (discussed below) ensure that corrupted and lost TLPs are corrected through retransmission. As used herein, the flow control mechanism of the transaction layer comprehends the virtual channels of the EGIO link 112. In this regard, each virtual channel supported by a receiver will be reflected in the flow control credits (FCC) advertised by the receiver.

According to one example implementation, flow control is performed by the transaction layer 202 in cooperation with the data link layer 204. That is, flow control information is conveyed between two sides of an EGIO link 112 (e.g., on a per-VC basis) using data link layer packets (DLLP), for use by the flow control mechanism of the transaction layer 202. For ease of illustration in describing the flow control mechanism, the following types of packet information, or flow control credit types, are distinguished:

(a) Posted Request Headers (PH)
(b) Posted Request Data (PD)
(c) Non-Posted Request Headers (NPH)
(d) Non-Posted Request Data (NPD)
(e) Read, Write and Message Completion Headers (CPLH)
(f) Read and Message Completion Data (CPLD)

As introduced above, the unit of measure in the EGIO implementation of proactive flow control is a flow control credit (FCC). In accordance with but one implementation, a flow control credit is sixteen (16) bytes for data. For headers, the unit of flow control credit is one header. As introduced above, independent flow control is maintained for each virtual channel. Accordingly, separate indicators of credits are maintained and tracked by the flow control mechanism within the transaction layer 202 for each of the foregoing types of packet information ((a)-(f), as denoted above) on a per-VC basis. In accordance with the illustrated example implementation, transmission of packets consume flow control credits in accordance with the following:

Memory/IO/Configuration Read Request: 1 NPH unit
Memory Write Request: 1PH+nPD units (where n is associated with the size of the data payload, e.g., the length of the data divided by the flow control unit size (e.g., 16 Bytes)
IO/Configuration Write Request: 1NPH+1NPD
Message Requests: Depending on the message at least 1PH and/or 1NPH unit(s)
Completions with Data: 1CPLH+nCPLD units (where n is related to size of data divided by the flow control data unit size, e.g., 16 Bytes)
Completions without Data: 1CPLH For each type of information tracked, there are three conceptual registers, each eight (8) bits wide, to monitor the Credits Consumed (in transmitter), a Credit Limit (in transmitter) and a Credits Allocated (in the receiver). The credits consumed register includes a count of the total number of flow control units, e.g., in modula-256, consumed since initialization. Having introduced the architectural elements of the flow control mechanism, an example method of initialization and operation is presented with reference to FIG. 6.

Figure 6:
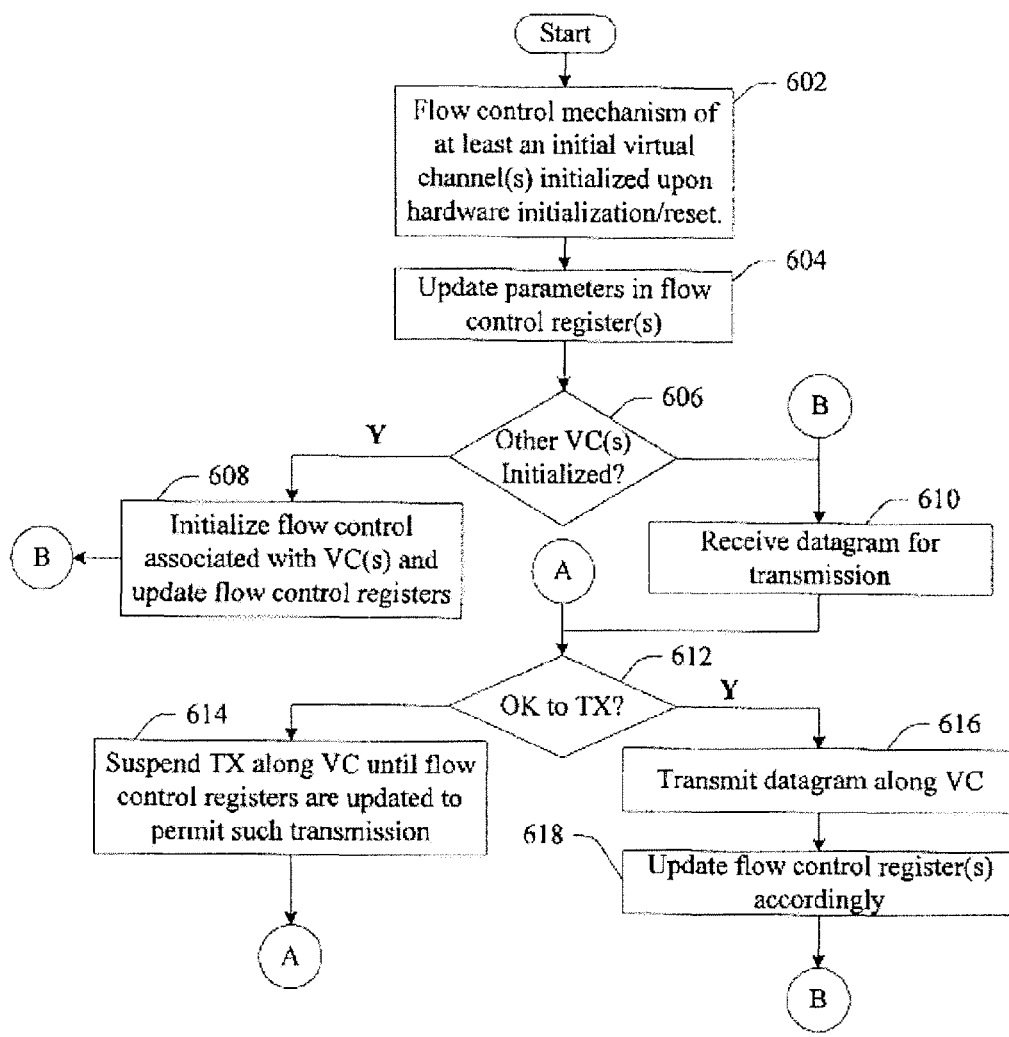
FIG. 6 is a flow chart of an example method for implementing flow control within the EGIO architecture, according to one aspect of the present invention.

FIG. 6 is a flow chart of an example method of operation of the flow control mechanism of the EGIO architecture, in accordance with but one example embodiment of the invention. In accordance with the illustrated example implementation of FIG. 6, the method begins with block 602 wherein the flow control mechanism described herein associated with at least an initial virtual channel is initialized upon hardware initialization, or reset. According to one example implementation, the flow control mechanism associated with VC0 (e.g., the default virtual channel for bulk communication) is initialized when the data link layer 204 of the EGIO interface 106 of an EGIO element is initialized.

In block 604, the flow control mechanism of the transaction layer 202 updates the parameters of the one or more flow control registers. That is, upon initialization the credits consumed register is set to all zeros (0) and incremented as the transaction layer commits to sending information to the data link layer. The size of the increment is associated with the number of credits consumed by the information committed to be sent. According to one implementation, when the maximum count (e.g., all 1's) is reached or exceeded, the counter rolls over to zero. According to one implementation, unsigned 8-bit modulo arithmetic is used to maintain the counter.

The credit limit register, maintained in the transmitter, contains the limit for the maximum number of flow control units that may be consumed. Upon interface initialization (e.g., start-up, reset, etc.), the credit limit register is set to all zeros, and is subsequently updated to reflect the value indicated in a flow control update message (introduced above) upon message receipt.

The credits allocated register, maintained in the receiver, maintains a count of the total number of credits granted to the transmitter since initialization. The count is initially set according to the buffer size and allocation policies of the receiver. This value may well be included in flow control update messages.

In block 606, the EGIO interface 106 determines whether additional virtual channels are required, i.e., beyond the default VC0. If so, as such additional VC's are established, the transaction layer initializes the flow control mechanism associated with such VC's, updating the flow control register(s) accordingly, block 608.

As above, when initializing the flow control mechanism associated with a virtual channel, the value is incremented as the receiver transaction layer removes processed information from its receive buffer. The size of the increment is associated with the size of the space made available. According to one embodiment, receivers should typically initially set the credits allocated to values equal to or greater than the following values:

PH: 1 flow control unit (FCU);
PD: FCU equal to the largest possible setting of the maximum payload size of the device;
NPH: 1 FCU
NPD: FCU equal to the largest possible setting of the maximum payload size of the device;
Switch devices—CPLH: 1FCU;
Switch devices—CPLD: FCU equal to the largest possible setting of the maximum payload size of the device, or the largest read request the device will ever generate, whichever is smaller;
Root & End-point Devices—CPLH or CPLD: 255 FCUs (all 1's), a value considered to be infinite by the transmitter, which will therefore never throttle.

In accordance with such an implementation, a receiver will typically not set credits allocated register values to greater than 127 FCUs for any message type.

In accordance with an alternate implementation, rather than maintaining the credits allocated register using the counter method, above, a receiver (or, transmitter) can dynamically calculate the credits available in accordance with the following equation:

$$C\_A = (\text{Credit unit number of the most recently received transmission}) + (\text{receive buffer space available}) \quad [7]$$

As introduced above, a transmitter will implement the conceptual registers (credit consumed, credit limit) for each of the virtual channels that the transmitter will utilize. Similarly, receivers implement the conceptual registers (credits allocated) for each of the virtual channels supported by the receiver. Once the flow control register(s) are established for the appropriate VC's, the EGIO interface 106 is ready to participate in EGIO communication as the process continues with block 610.

In block 610, the EGIO interface 106 in a transmitter receives a datagram for transmission along a VC. In block 612, prior to transmission of the received datagram, the flow control mechanism in the transaction layer 202 of the EGIO element to transmit the datagram across the EGIO link confirms that such transmission will not result in an overflow condition at the receiver. According to one example implementation, the flow control mechanism of the transaction layer 202 makes this determination based, at least in part, on the credits available register and the number of credits to be consumed by the transmission of the datagram.

To proactively inhibit the transmission of information if to do so would cause receive buffer overflow, a transmitter is permitted to transmit a type of information if the credits consumed count plus the number of credit units associated with the data to be transmitted is less than or equal to the credit limit value, i.e., $$\text{Cred\_Req} = (\text{Cred\_Consumed} + \langle\text{Info\_cred}\rangle) \bmod 2^{[\textit{field size}]} \quad [8]$$

where the field size is eight (8) for PH, NPH, CLPH, and twelve (12) for PD, NPD and CPLD.

When a transmitter receives flow control information for completions (CPLs) indicating non-infinite credits (i.e., <255 FCUs), the transmitter will throttle completions according to the credit available. When accounting for credit use and return, information from different transactions is not mixed within a credit. Similarly, when accounting for credit use and return, header and data information from one transaction is never mixed within one credit. Thus, when some packet is blocked from transmission by a lack of flow control credit(s), transmitters will follow the ordering rules (above) when determining what types of packets should be permitted to bypass the "stalled" packet.

If, in block 612 the flow control mechanism determines that the receiver does not have adequate buffer space to receive the datagram, the flow control mechanism temporarily suspends transmission along the associated virtual channel until the flow control register(s) in the transmitter are updated to permit such transmission, block 614. According to one example embodiment, updates are received through a flow control update message, described more fully below.

If, in block 612, the flow control mechanism concludes that transmission of the datagram will not result in an overflow condition at the receiver, the EGIO interface 106 proceeds to transmit the datagram, block 616. As introduced above, transmission of the datagram involves processing steps (e.g., addition of headers, data integrity information etc.) at the transaction layer 202, data link layer 204 and/or physical layer 206.

According to one embodiment, in response to receipt of a datagram via a virtual channel, the flow control mechanism in the receiver will issue a flow control update. Such an update may be in the form of a header in an acknowledgement packet, etc. In such an embodiment, the return of flow control credits for a transaction is not interpreted to mean that the transaction has completed or achieved system visibility. Message signaled interrupts (MSI) using a memory write request semantic are treated like any other memory write. If a subsequent FC Update Message (from the receiver) indicates a lower credit_limit value than was initially indicated, the transmitter should respect the new lower limit and may well provide a messaging error.

In accordance with the flow control mechanism described herein, if a receiver receives more information than it has allocated credits for (exceeding the credits allocated) the receiver will indicate a receiver overflow error to the offending transmitter, and initiate a data link level retry request for the packet causing the overflow.

In block 618, upon receipt of flow control update information, the flow control mechanism associated with the particular virtual channel in the transmitter updates the flow control register(s) accordingly to facilitate subsequent flow control.

Having introduced the architectural elements and example operational detail above, an example protocol for communicating flow control information is presented. According to one example embodiment, flow control information is communicated at the data link layer 204 using flow control packets.

Flow Control Packets (FCPs)

According to one implementation, the flow control information necessary to maintain the registers, above, is communicated between devices using flow control packets (FCPs). An example flow control packet is graphically presented with reference to FIG. 9. According to one embodiment, flow control packets 900 are comprised of two-DW Header format and convey information for a specific Virtual Channel about the status of the six Credit registers maintained by the Flow Control logic of the Receive Transaction Layer for each VC.

In accordance with one embodiment of the teachings of the present invention there are two types of FCPs: Initial FCP and Update FCP, as illustrated in FIG. 9. As introduced above, an Initial FCP 902 is issued upon initialization of the Transaction Layer. Following initialization of the Transaction Layer, Update FCPs 904 are used to update information in the registers.

Receipt of an Initial FCP 902 during normal operation causes a reset of the local flow control mechanism and the transmission of an Initial FCP 902. The content of an Initial FCP 902 includes at least a subset of the advertised credits for each of the PH, PD, NPH, NPD, CPHL, CPHD, and Channel ID (e.g., the Virtual channel associated to which FC information applies).

The format of an Update FCP 904 is similar to that of the Initial FCP 902. Note that although the FC Header does not include the Length field common other transaction layer packet header format, the size of the Packet is unambiguous because there is no additional DW data associated with this Packet.

Error Forwarding

Unlike conventional error forwarding mechanisms, the EGIO architecture relies on tailer information, appended to datagram(s) identified as defective for any of a number of reasons, as discussed below. According to one example implementation, the transaction layer 202 employs any of a number of well-known error detection techniques such as, for example, cyclical redundancy check (CRC) error control and the like.

According to one implementation, to facilitate error forwarding features, the EGIO architecture uses a "tailer", which is appended to TLPs carrying known bad data. Examples of cases in which tailer Error Forwarding might be used include:

EXAMPLE #1

A read from main memory encounters uncorrectable ECC error

EXAMPLE #2

Parity error on a PCI write to main memory

EXAMPLE #3

Data integrity error on an internal data buffer or cache.

According to one example implementation, error forwarding is only used for read completion data, or the write data. That is, error forwarding is not typically employed for cases when the error occurs in the administrative overhead associated with the datagram, e.g., an error in the header (e.g., request phase, address/command, etc.). As used herein, requests/completions with header errors cannot be forwarded in general since a true destination cannot be positively identified and, therefore, such error forwarding may well cause a direct or side effects such as, fore example data corruption, system failures, etc. According to one embodiment, error forwarding is used for propagation of error through the system, system diagnostics. Error forwarding does not utilize data link layer retry and, thus TLPs ending with the tailer will be retried only if there are transmission errors on the EGIO link 112 as determined by the TLP error detection mechanisms (e.g., cyclical redundancy check (CRC), etc.). Thus, the tailer may ultimately cause the originator of the request to re-issue it (at the transaction layer of above) or to take some other action.

As used herein, all EGIO receivers (e.g., located within the EGIO interface 106) are able to process TLPs ending with a tailer. Support for adding a tailer in a transmitter is optional (and therefore compatible with legacy devices). Switches 108 route a tailer along with the rest of a TLP. Host Bridges 104 with peer routing support will typically route a tailer along with the rest of a TLP, but are not required to do so. Error Forwarding typically applies to the data within a Write Request (Posted or Non-Posted) or a Read Completion. TLPs which are known to the transmitter to include bad data should end with the tailer.

According to one example implementation, a tailer consists of two DW, wherein bytes [7:5] are all zeroes (e.g., 000), and bits [4:1] are all ones (e.g., 1111), while all other bits are reserved. An EGIO receiver will consider all the data within a TLP ending with the tailer corrupt. If applying error forwarding, the receiver will cause all data from the indicated TLP to be tagged as bad ("poisoned"). Within the transaction layer, a parser will typically parse to the end of the entire TLP and check immediately the following data to understand if the data completed or not.

Data Link Layer 204

As introduced above, the data link layer 204 of FIG. 2 acts as an intermediate stage between the Transaction Layer 202 and the Physical Layer 206. The primary responsibility of the data link layer 204 is providing a reliable mechanism for exchanging Transaction Layer Packets (TLPs) between two components over an EGIO Link 112. The transmission side of the Data Link Layer 204 accepts TLPs assembled by the Transaction Layer 202, applies a Packet Sequence Identifier (e.g., an identification number), calculates and applies an error detection code (e.g., CRC code), and submits the modified TLPs to the Physical Layer 206 for transmission across a select one or more of the virtual channels established within the bandwidth of the EGIO Link 112.

The receiving Data Link Layer 204 is responsible for checking the integrity of received TLPs (e.g., using CRC mechanisms, etc.) and for submitting those TLPs for which the integrity check was positive to the Transaction Layer 204 for disassembly before forwarding to the device core. Services provided by the Data Link Layer 204 generally include data exchange, error detection and retry, initialization and power management services, and data link layer inter-communication services. Each of the services offered under each of the foregoing categories are enumerated below.

Data Exchange Services
Accept TLPs for transmission from the Transmit Transaction Layer
   i. Accept TLPs received over the Link from the Physical Layer and convey them to the Receive Transaction Layer
Error Detection & Retry
TLP Sequence Number and CRC generation
Transmitted TLP storage for Data Link Layer Retry
Data integrity checking
Acknowledgement and Retry DLLPs
Error indications for error reporting and logging mechanisms
   i. Link Ack Timeout timer
Initialization and Power Management Services
Track Link state and convey active/reset/disconnected state to Transaction Layer
Data Link Layer Inter-Communication Services
Used for Link Management functions including error detection and retry
Transferred between Data Link Layers of the two directly connected components
Not exposed to the Transaction Layers As used within the EGIO interface 106, the Data Link Layer 204 appears as an information conduit with varying latency to the Transaction Layer 202. All information fed into the Transmit Data Link Layer will appear at the output of the Receive Data Link Layer at a later time. The latency will depend on a number of factors, including pipeline latencies, width and operational frequency of the Link 112, transmission of communication signals across the medium, and delays caused by Data Link Layer Retry. Because of these delays, the Transmit Data Link Layer can apply backpressure to the Transmit Transaction Layer 202, and the Receive Data Link Layer communicates the presence or absence of valid information to the Receive Transaction Layer 202.

Figure 11:
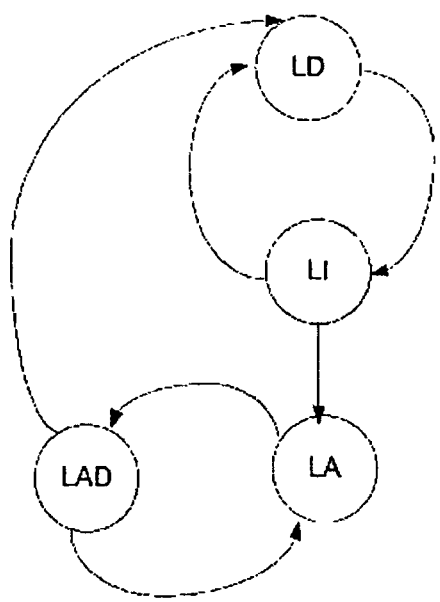
FIG. 11 is a state diagram of an example links state machine diagram, according to one aspect of the present invention.

According to one implementation, the data link layer 204 tracks the state of the EGIO link 112. In this regard, the DLL 204 communicates Link status with the Transaction 202 and Physical Layers 206, and performs Link Management through the Physical Layer 206. According to one implementation, the Data Link Layer contains a Link Control and Management State Machine to perform such management tasks, an example of which is graphically illustrated with reference to FIG. 11. In accordance with the example implementation of FIG. 11, the states 1100 of the link control and management state machine are defined as:

Example DLL Link States
LinkDown (LD)—Physical Layer reporting Link is non-operational or Port is not connected LinkInit (LI)—Physical Layer reporting Link is operational and is being initialized
LinkActive (LA)—Normal operation mode
LinkActDefer (LAD)—Normal operation disrupted, Physical Layer attempting to resume
Corresponding Management Rules per state:
LinkDown (LD)
Initial state following Component reset
Upon entry to LD:
Reset all Data Link Layer state information to default values
While in LD:
Do not exchange TLP information with the Transaction or Physical Layers
Do not exchange DLLP information with the Physical Layer
Do not generate or accept DLLPs
Exit to LI if:
Indication from the Transaction Layer that the Link is not disabled by SW
LinkInit (LI)
While in LI:
Do not exchange TLP information with the Transaction or Physical Layers
Do not exchange DLLP information with the Physical Layer
Do not generate or accept DLLPs
Exit to LA if:
Indication from the Physical Layer that the Link training succeeded Exit to LD if:
Indication from the Physical Layer that the Link training failed
LinkActive (LA)
While in LinkActive:
Exchange TLP information with the Transaction and Physical Layers
Exchange DLLP information with the Physical Layer
Generate and accept DLLPs.
Exit to LinkActDefer if:
Indication from the Data Link Layer Retry management mechanism that Link retraining is required, OR if Physical Layer reports that a retrain is in progress.
LinkActDefer (LAD)
While in LinkActDefer:
Do not exchange TLP information with the Transaction or Physical Layers
Do not exchange DLLP information with the Physical Layer
Do not generate or accept DLLPs
Exit to LinkActive if:
Indication from the Physical Layer that the retraining was successful
Exit to LinkDown if:
Indication from the Physical Layer that the retraining failed
Data Integrity Management
As used herein, data link layer packets (DLLPs) are used to support the EGIO link data integrity mechanisms. In this regard, according to one implementation, the EGIO architecture provides for the following DLLPs to support link data integrity management:
Ack DLLP: TLP Sequence number acknowledgement—used to indicate successful receipt of some number of TLPs
Nak DLLP: TLP Sequence number negative acknowledgement—used to indicate a Data Link Layer Retry
Ack Timeout DLLP: Indicates recently transmitted Sequence Number—used to detect some forms of TLP loss As introduced above, the transaction layer 202 provides TLP boundary information to Data Link Layer 204, enabling the DLL 204 to apply a Sequence Number and cyclical redundancy check (CRC) error detection to the TLP. According to one example implementation, the Receive Data Link Layer validates received TLPs by checking the Sequence Number, CRC code and any error indications from the receive Physical Layer. In case of error in a TLP, Data Link Layer Retry is used for recovery.
CRC, Sequence Number, and Retry Management (Transmitter)
The mechanisms used to determine the TLP CRC and the Sequence Number and to support Data Link Layer Retry are described in terms of conceptual "counters" and "flags", as follows:
CRC and Sequence Number Rules (Transmitter)
The following 8 bit counters are used:
TRANS_SEQ—Stores the sequence number applied to TLPs being prepared for transmission
Set to all '0's in LinkDown state
Incremented by 1 after each TLP transmitted
When at all '1's the increment causes a roll-over to all '0's
Receipt of a Nak DLLP causes the value to be set back to the sequence number indicated in the Nak DLLP
ACKD_SEQ—Stores the sequence number acknowledged in the most recently received Link to Link Acknowledgement DLLP.
Set to all '1's in LinkDown state
Each TLP is assigned an 8 bit sequence number
The counter TRANS_SEQ stores this number
If TRANS_SEQ equals (ACKD_SEQ−1) modulo 256, the Transmitter should typically not transmit another TLP until an Ack DLLP updates ACKD_SEQ such that the condition (TRANS_SEQ==ACKD_SEQ−1) modulo 256 is no longer true.
TRANS_SEQ is applied to the TLP by:
prepending the single Byte value to the TLP
prepending a single Reserved Byte to the TLP
A 32 b CRC is calculated for the TLP using the following algorithm and appended to the end of the TLP
The polynomial used is 0x04C11DB7
the same CRC-32 used by Ethernet
The procedure for the calculation is:
1) The initial value of the CRC-32 calculation is the DW formed by prepending 24 '0's to the Sequence Number
2) The CRC calculation is continued using each DW of the TLP from the Transaction Layer in order from the DW including Byte 0 of the Header to the last DW of the TLP
3) The bit sequence from the calculation is complemented and the result is the TLP CRC
4) The CRC DW is appended to the end of the TLP
Copies of Transmitted TLPs should typically be stored in the Data Link Layer Retry Buffer
When an Ack DLLP is received from the other Device:
ACKD_SEQ is loaded with the value specified in the DLLP
The Retry Buffer is purged of TLPs with Sequence Numbers in the range:
From the previous value of ACKD_SEQ+1
To the new value of ACKD_SEQ When a Nak DLLP is received from the other Component on the Link:
 If a TLP is currently being transferred to the Physical Layer, the transfer continues until the transfer of this TLP is complete
 Additional TLPs are not taken from the Transaction Layer until the following steps are complete
 The Retry Buffer is purged of TLPs with Sequence Numbers in the range:
  The previous value of ACKD_SEQ+1
  The value specified in the Nak Sequence Number field of the Nak DLLP
 All remaining TLPs in the Retry Buffer are re-presented to the Physical Layer for re-transmission in the original order
  Note: This will include all TLPs with Sequence Numbers in the range:
  The value specified in the Nak Sequence Number field of the Nak DLLP+1
  The value of TRANS_SEQ−1
  If there are no remaining TLPs in the Retry Buffer, the Nak DLLP was in error
  The erroneous Nak DLLP should typically be reported according to the Error Tracking and Logging Section
  No further action is required by the Transmitter CRC and Sequence Number (Receiver)

Similarly, the mechanisms used to check the TLP CRC and the Sequence Number and to support Data Link Layer Retry are described in terms of conceptual "counters" and "flags" as follows:
 The following 8 bit counter is used:
  NEXT_RCV_SEQ—Stores the expected Sequence Number for the next TLP
   Set to all '0's in LinkDown state
   Incremented by 1 for each TLP accepted, or when the DLLR_IN_PROGRESS flag (described below) is cleared by accepting a TLP
   Loaded with the value (Trans. Seq. Num+1) each time a Link Layer DLLP is received and the DLLR_IN_PROGRESS flag is clear.
  A loss of Sequence Number synchronization between Transmitter and Receiver is indicated if the value of NEXT_RCV_SEQ differs from the value specified by a received TLP or an Ack Timeout DLLP; in this case:
 If the DLLR_IN_PROGRESS flag is set,
  Reset DLLR_IN_PROGRESS flag
  Signal a "Sent Bad DLLR DLLP" error to Error Logging/Tracking
  Note: This indicates that a DLLR DLLP (Nak) was sent in error
 If the DLLR_IN_PROGRESS flag is not set,
  Set DLLR_IN_PROGRESS flag and initiate Nak DLLP
  Note: This indicates that a TLP was lost
 The following 3 bit counter is used:
  DLLRR_COUNT—Counts number of times DLLR DLLP issued in a specified time period
Set to b'000 in LinkDown state
Incremented by 1 for each Nak DLLP issued
When the count reaches b'100:
 The Link Control State Machine moves from LinkActive to LinkActDefer
 DLLRR_COUNT is then reset to b'000
If DLLRR_COUNT not equal to b'000, decrements by 1 every 256 Symbol Times
 i.e.: Saturates at b'000
The following flag is used:
 DLLR_IN_PROGRESS Set/Clear conditions are described below
 When DLLR_IN_PROGRESS is set, all received TLPs are rejected (until the TLP indicated by the DLLR DLLP is received)
 When DLLR_IN_PROGRESS is clear, Received TLPs are checked as described below
For a TLP to be accepted, the following conditions should typically be true:
 The Received TLP Sequence Number is equal to NEXT_RCV_SEQ
 The Physical Layer has not indicated any errors in Receipt of the TLP
 The TLP CRC check does not indicate an error
When a TLP is accepted:
 The Transaction Layer part of the TLP is forwarded to the Receive Transaction Layer
 If set, the DLLR_IN_PROGRESS flag is cleared
 NEXT_RCV_SEQ is incremented
When a TLP is not accepted:
 The DLLR_IN_PROGRESS flag is set
 A Nak DLLP is sent
The Ack/Nak Sequence Number field should typically contain the value (NEXT_RCV_SEQ −1)
The Nak Type (NT) field should typically indicate the cause of the Nak:
 b'00—Receive Error identified by Physical Layer
 b'01—TLP CRC check failed
 b'10—Sequence Number incorrect
 b'11—Framing Error identified by the Physical Layer
The Receiver should typically not allow the time from the receipt of the CRC for a TLP to Transmission of Nak to exceed 1023 Symbol Times, as measured from the Port of the component.
 Note: NEXT_RCV_SEQ is not incremented
If the Receive Data Link Layer fails to receive the expected TLP following a Nak DLLP within 512 Symbol Times, the Nak DLLP is repeated.
 If after four attempts the expected TLP has still not been received, the receiver will:
  Enter the LinkActDefer state and initiate Link retraining by the Physical Layer
  Indicate the occurrence of a major error to Error Tracking and Logging
Data Link Layer Acknowledgement DLLPs should typically be Transmitted when the following conditions are true:
 The Data Link Control and Management State Machine is in the LinkActive state
 TLPs have been accepted, but not yet acknowledged by sending an Acknowledgement DLLP
 More than 512 Symbol Times have passed since the last Acknowledgement DLLP
Data Link Layer Acknowledgement DLLPs may be Transmitted more frequently than required
Data Link Layer Acknowledgement DLLPs specify the value (NEXT_RCV_SEQ−1) in the Ack Sequence Num field Ack Timeout Mechanism Consider the case where a TLP is corrupted on the Link 112 such that the Receiver does not detect the existence of the TLP. The lost TLP will be detected when a following TLP is sent because the TLP Sequence Number will not match the expected Sequence Number at the Receiver. However, the Transmit Data Link Layer 204 cannot in general bound the time for the next TLP to be presented to it from the Transmit Transport Layer. The Ack Timeout mechanism allows the Transmitter to bound the time required for the Receiver to detect the lost TLP.

Ack Timeout Mechanism Rules

If the Transmit Retry Buffer contains TLPs for which no Ack DLLP have been received, and if no TLPs or Link DLLPs have been transmitted for a period exceeding 1024 Symbol Times, an Ack Timeout DLLP should typically be transmitted.

Following the Transmission of an Ack Timeout DLLP, the Data Link Layer should typically not pass any TLPs to the Physical Layer for Transmission until an Acknowledgement DLLP has been received from the Component on the other side of the Link.

If no Acknowledgement DLLP is received for a period exceeding 1023 Symbol Times, the Ack Timeout DLLP is Transmitted again 1024 Symbol Times after the fourth successive transmission of an Ack Timeout DLLP without receipt of an Acknowledgement DLLP, Enter the LinkActDefer state and initiate Link retraining by the Physical Layer Indicate the occurrence of a major error to Error Tracking and Logging.

Figure 7:
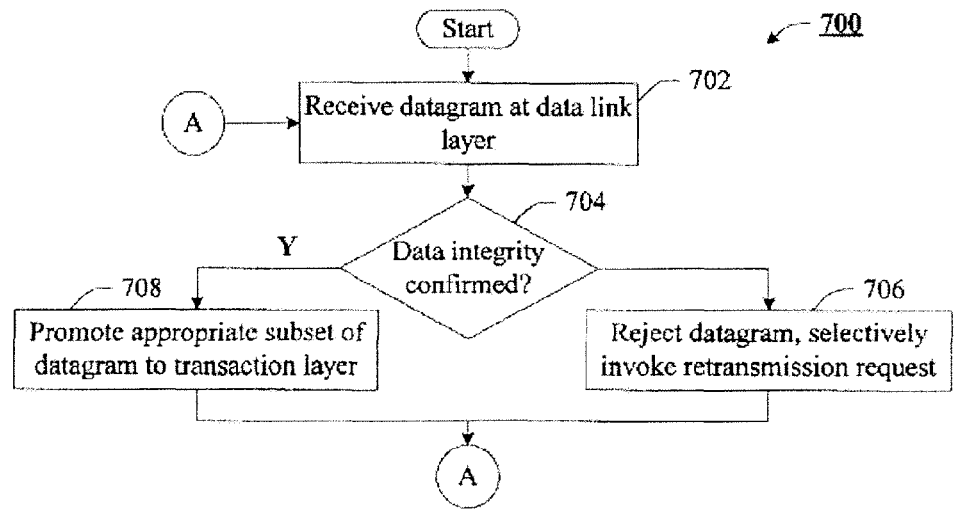
FIG. 7 is a flow chart of an example method for implementing data integrity features within the EGIO architecture, according to one aspect of the invention.

Having introduced the architectural and protocol elements of the data integrity mechanism of the data link layer 204, above, reference is made to FIG. 7, wherein an example implementation of the data integrity mechanism is presented according to one example embodiment.

FIG. 7 is a flow chart of an example method for monitoring data integrity within the EGIO architecture, according to one example embodiment of the invention. In accordance with the illustrated example implementation of FIG. 7, the method begins with block 702 wherein a datagram is received via a virtual channel at an EGIO interface 106 of an EGIO element. As presented above, the datagram is received via the physical link layer 206 before promotion to the data link layer 204. According to certain embodiments, the physical layer 206 determines whether the received datagram conforms with packet framing requirements, etc. In certain embodiments, a datagram that fails to meet such framing requirements is discarded without promotion to or analysis by the data integrity mechanism of the data link layer 204. If the framing is confirmed, the physical layer strips the framing boundaries from the datagram to reveal a data link layer packet, which is promoted to the data link layer.

In block 704, upon receipt of the datagram from the physical layer 206, the integrity of the data link layer packet is confirmed within the data link layer 204. As presented above, the data integrity mechanism of the data link layer 204 employs one or more of the sequence number, CRC information, etc. to confirm that the information within the DLLP including, inter alia, the TLLP, is accurate.

If, in block 704, the data link layer 204 identifies a flaw in the integrity of the received DLLP, the data link layer 204 invokes an instance of the error processing mechanism described above.

If, in block 704, the data link layer 204 confirms the integrity of the received DLLP, at least a subset of the received DLLP is promoted to the transaction layer 202, block 708. According to one example implementation, the data link layer-specific information (e.g., header, footer, etc.) is stripped to reveal a TLLP, which is passed to the transaction layer for further processing.

Physical Layer 206

With continued reference to FIG. 2, the physical layer 206 is presented. As used herein, the physical layer 206 isolates the transaction 202 and data link 204 layers from the signaling technology used for link data interchange. In accordance with the illustrated example implementation of FIG. 2, the Physical Layer is divided into the logical 208 and physical 210 functional sub-blocks.

As used herein, the logical sub-block 208 is responsible for the "digital" functions of the Physical Layer 206. In this regard, the logical sub-block 204 has two main divisions: a Transmit section that prepares outgoing information for transmission by the physical sub-block 210, and a Receiver section that identifies and prepares received information before passing it to the Link Layer 204. The logical sub-block 208 and physical sub-block 210 coordinate the Port state through a status and control register interface. Control and management functions of the Physical Layer 206 are directed by the logical sub-block 208.

According to one example implementation, the EGIO architecture employs an 8 b/10 b transmission code. Using this scheme, eight-bit characters are treated as three-bits and five-bits mapped onto a four-bit code group and a six-bit code group, respectively. These code groups are concatenated to form a ten-bit Symbol. The 8 b/10 b encoding scheme used by EGIO architecture provides Special Symbols which are distinct from the Data Symbols used to represent Characters. These Special Symbols are used for various Link Management mechanisms below. Special Symbols are also used to frame DLLPs and TLPs, using distinct Special Symbols to allow these two types of Packets to be quickly and easily distinguished.

The physical sub-block 210 contains a Transmitter and a Receiver. The Transmitter is supplied by the Logical sub-block 208 with Symbols which it serializes and transmits onto the Link 112. The Receiver is supplied with serialized Symbols from the Link 112. It transforms the received signals into a bit-stream which is de-serialized and supplied to the Logical sub-block 208 along with a Symbol clock recovered from the incoming serial stream. It will be appreciated that, as used herein, the EGIO link 112 may well represent any of a wide variety of communication media including an electrical communication link, an optical communication link, an RF communication link, an infrared communication link, a wireless communication link, and the like. In this respect, each of the transmitter(s) and/or receiver(s) comprising the physical sub-block 210 of the physical layer 206 is appropriate for one or more of the foregoing communication links.

Example Communication Agent

Figure 8:
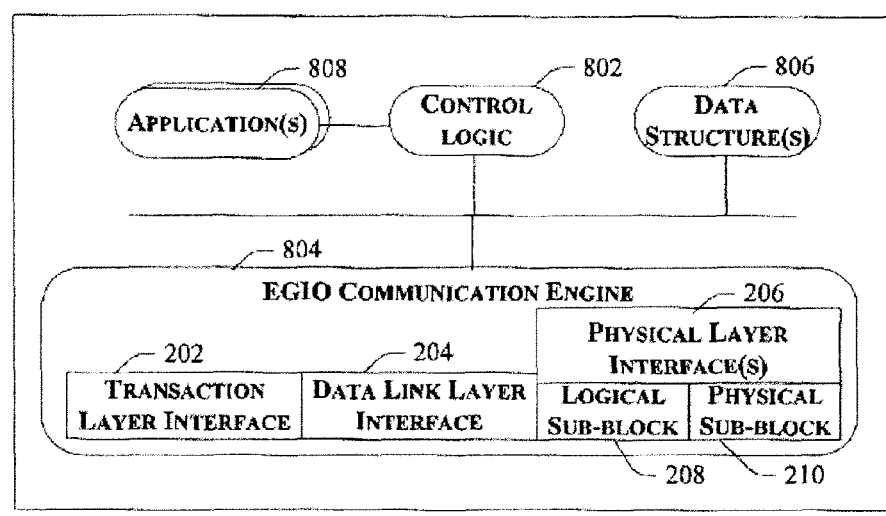
FIG. 8 is a block diagram of an example communication agent to selectively implement one or more aspects of the invention, according to one example embodiment of the invention.

FIG. 8 illustrates a block diagram of an example communication agent incorporating at least a subset of the features associated with the present invention, in accordance with one example implementation of the present invention. In accordance with the illustrated example implementation of FIG. 8, communications agent 800 is depicted comprising control logic 802, an EGIO communication engine 804, memory space for data structures 806 and, optionally one or more applications 808.

As used herein, control logic 802 provides processing resources to each of the one or more elements of EGIO communication engine 604 to selectively implement one or more aspects of the present invention. In this regard, control logic 802 is intended to represent one or more of a microprocessor, a microcontroller, a finite state machine, a programmable logic device, a field programmable gate array, or content which, when executed, implements control logic to function as one of the above.

EGIO communication engine 804 is depicted comprising one or more of a transaction layer interface 202, a data link layer interface 204 and a physical layer interface 206 comprising a logical sub-block 208 and a physical sub-block 210 to interface the communication agent 800 with an EGIO link 112. As used herein, the elements of EGIO communication engine 804 perform function similar, if not equivalent to, those described above.

In accordance with the illustrated example implementation of FIG. 8, communications agent 800 is depicted comprising data structures 806. As will be developed more fully below with reference to FIG. 10, data structures 806 may well include memory space, IO space, configuration space and message space utilized by communication engine 804 to facilitate communication between elements of the EGIO architecture.

As used herein, applications 808 are intended to represent any of a wide variety of applications selectively invoked by communication engine 800 to implement the EGIO communication protocol and associated management functions. According to one example implementation, the bandwidth manager, flow control mechanism, data integrity mechanism, and support for legacy interrupts are embodied as executable content within communications agent 800 selectively invoked by one or more of the appropriate elements of the EGIO communication engine 804.

Example Data Structure(s)

Turning to FIG. 10 a graphical illustration of one or more data structure(s) employed by EGIO interface(s) 106 are depicted, in accordance with one implementation of the present invention. More particularly, with reference to the illustrated example implementation of FIG. 10, four (4) address spaces are defined for use within the EGIO architecture: the configuration space 1010, the IO space 1020, the memory space 1030 and the message space 1040. As shown, configuration space 1010 includes a header field 1012, which includes information defining the EGIO category to which a host device belongs (e.g., end-point, switch, root complex, etc.). Each of such address spaces perform their respective functions as detailed above.

Alternate Embodiments

Figure 12:
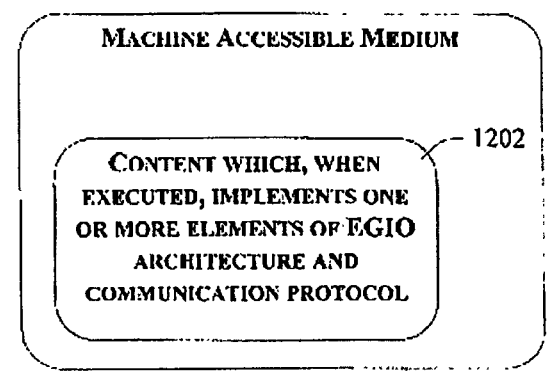
FIG. 12 is a block diagram of an accessible medium comprising content which, when accessed by an electronic device, implements one or more aspects of the present invention.

FIG. 12 is a block diagram of a storage medium having stored thereon a plurality of instructions including instructions to implement one or more aspects of the EGIO interconnection architecture and communication protocol, according to yet another embodiment of the present invention.

In general, FIG. 12 illustrates a machine accessible medium/device 1200 having content 1202 stored thereon(in) including at least a subset of which that, when executed by an accessing machine, implement the innovative EGIO interface 106 of the present invention. As used herein, machine accessible medium 1200 is intended to represent any of a number of such media known to those skilled in the art such as, for example, volatile memory devices, non-volatile memory devices, magnetic storage media, optical storage media, propagated signals and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the medium 1200 need not be co-located with any host system. That is, medium 1200 may well reside within a remote server communicatively coupled to and accessible by an executing system. Accordingly, the software implementation of FIG. 12 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method, comprising:
   initializing a flow control mechanism within a general input/output interface of a transmitting device associated with a virtual channel upon initialization of the virtual channel; and
   tracking buffer availability in a remote receiving device having a general input/output interface coupled with the general input/output interface of the transmitting device via the virtual channel by monitoring an indication associated with an amount of content transmitted from the general input/output interface of the transmitting device to the remote general input/output interface of the receiving device;
   selectively suspending transmission to the remote general input/output interface of the receiving device through the virtual channel when the general input/output interface of the transmitting device determines that the receive buffer availability has reached a threshold; and,
   determining according to ordering rules what types of packets should be permitted to bypass a packet not yet transmitted.

2. A method according to claim 1, further comprising:
   tagging transactions by adding a transaction descriptor to a packet including an ordering attribute including the type of ordering.

3. A method according to claim 2, wherein the threshold is set to prevent a buffer overflow condition.

4. A method according to claim 2, further comprising:
   resuming transmission of content through the virtual channel when the GIO interface of the transmitting device receives an indication from the remote GIO interface of the receiving device of receive buffer availability.

5. A method according to claim 4, wherein the received indication is an update flow control packet.

6. A method according to claim 2, further comprising:
   resuming transmission of content through the virtual channel after a period of time has lapsed.

7. A method according to claim 1, the element of initializing the flow control mechanism comprising:
   receiving an indication from the remote GIO interface of the receiving device of a number of credits allocated to transmission to the remote GIO from the transmitting device, wherein a credit is associated with an amount of content.

8. A method according to claim 7, the element of initializing further comprising:
   establishing one or more of a credit consumed buffer and a credit limit buffer in the GIO interface of the transmitting device, wherein the credit limit buffer is populated with an indication of credits allocated by the remote GIO interface of the receiving device.

9. A method according to claim 7, further comprising:
determining a number of credits to be consumed by a prospective transmission of content from the GIO interface of the transmitting device to the remote GIO interface of the receiving device; and
selectively transmitting the content to the remote GIO interface of the receiving device if when added to the credit consumed buffer by the transmitting device, the determined number of credits to be consumed by the prospective transmission does not exceed indication of credits allocated in the credit limit buffer.

10. A method according to claim 9, further comprising:
updating the credits consumed buffer with the transmitting device with an indication of the credits consumed by a transmission if the transmission is effected.

11. A method according to claim 9, further comprising:
suspending transmission of the content if it is determined by the transmitting device that the credits to be consumed by the prospective transmission would send the credits consumed buffer over that permitted by the credit limit buffer.

12. A method according to claim 11, further comprising:
receiving an indication from the remote GIO interface denoting a credit availability.

13. A method according to claim 12, further comprising:
updating the credit consumed register in the GIO interface of the transmitting device to reflect the credit availability denoted in the received indication from the remote GIO interface.

14. A general input/output interface in a transmitting device, comprising:
a physical layer to couple the general input/output interface to a general input/output interface communication link; and
a transaction layer coupled with the physical layer through a data link layer, the transaction layer including a flow control mechanism dynamically established upon initialization of a virtual channel between the general input/output interface and a remote general input/output interface of a receiving device, to monitor an ability of the remote general input/output interface to receive transmissions from the general input/output interface, and to suspend further transmissions if it is determined that further transmission would result in an overflow condition at the remote general input/output interface in the receiving device, and where, the transmitting device determines according to ordering rules what types of packets should be permitted to bypass a packet not yet transmitted.

15. A general input/output interface according to claim 14, wherein the transaction layer tags transactions by adding a transaction descriptor to a packet including an ordering attribute including the type of ordering.

16. A GIO interface according to claim 15, wherein suspension of transmission in any one of a plurality of virtual channels does not affect transmission on any other established virtual channels.

17. A GIO interface according to claim 16, the flow control mechanism further comprising:
a credit limit buffer, populated with a value received from the remote GIO interface denoting a number of flow control credits allocated to the virtual channel during initialization of the virtual channel.

18. A GIO interface according to claim 17, the flow control mechanism further comprising:
a credits consumed buffer, to maintain a value associated with an amount of content transmitted to the remote GIO interface.

19. A GIO interface according to claim 18, wherein the flow control mechanism of the transmitting device determines whether the remote GIO interface of the receiving device can receive a prospective transmission of content by adding flow control credits to be consumed by the prospective transmission to the credits consumed buffer to identify whether the prospective transmission would cause the credits consumed buffer to exceed a threshold associate with the credit limit buffer.

20. A GIO interface according to claim 18, wherein the flow control mechanism suspends further transmission along a virtual channel if the credits consumed buffer reaches the threshold associated with the credit limit buffer.

21. A GIO interface according to claim 20, wherein the threshold associated with the credit limit buffer is a number of credits denoted by the credit limit buffer.

22. A GIO interface according to claim 20, wherein the flow control mechanism resumes transmission along the virtual channel upon receipt of an update message denoting that the remote GIO interface is ready to receive additional transmissions.

23. A GIO interface according to claim 22, wherein the update message includes an indication of credit availability of the receive buffer, wherein the flow control mechanism updates the credit consumed buffer with the indication of credit availability of the update message.

* * * * *